United States Patent [19]
Otani et al.

[11] Patent Number: 6,154,309
[45] Date of Patent: Nov. 28, 2000

[54] COMPLEMENTARY OPTICAL SAMPLING WAVEFORM MEASURING APPARATUS AND POLARIZATION BEAM SPLITTER WHICH CAN BE ASSEMBLED THEREIN

[75] Inventors: Akihito Otani; Toshinobu Otsubo, both of Atsugi; Hidehiko Takara, Yokosuka; Satoki Kawanishi, Zushi, all of Japan

[73] Assignees: Anritsu Corporation; Nippon Telegraph and Telephone Corporation, both of Tokyo, Japan

[21] Appl. No.: 09/154,445

[22] Filed: Sep. 16, 1998

[30] Foreign Application Priority Data

Sep. 19, 1997 [JP] Japan ................................. 9-255742

[51] Int. Cl.[7] ....................................................... G02F 1/35
[52] U.S. Cl. .......................... 359/326; 359/495; 359/497; 385/11
[58] Field of Search .................................... 359/326–332, 359/494–499; 349/194, 196, 197; 385/11

[56] References Cited

U.S. PATENT DOCUMENTS

| | | | |
|---|---|---|---|
| 4,575,193 | 3/1986 | Greivenkamp, Jr. | 359/498 X |
| 4,702,557 | 10/1987 | Beckmann et al. | 349/197 |
| 5,471,340 | 11/1995 | Cheng et al. | 359/497 X |
| 5,872,878 | 2/1999 | Bergmann | 359/497 X |

FOREIGN PATENT DOCUMENTS

| | | |
|---|---|---|
| 6-63869 | 8/1994 | Japan . |
| 10-160583 | 6/1998 | Japan . |
| 10-197350 | 7/1998 | Japan . |

*Primary Examiner*—John D. Lee
*Attorney, Agent, or Firm*—Frishauf, Holtz, Goodman, Langer & Chick, P.C.

[57] ABSTRACT

A sampling light source generates a pulse sequence of sampling light having a pulse width smaller than that of target light and a single plane of polarization. A polarization beam splitting unit splits each of the sampling light output from the sampling light source, and the target light into two light components having planes of polarization shifted 90° from each other, multiplexes each pair of split sampling and target light components having planes of polarization shifted 90° from each other, and outputs the respective multiplexed light components to different optical paths. A pair of nonlinear optical members each generate a cross-correlation signal based on the sampling and target light components output from the polarization beam splitting unit to each optical path and having planes of polarization shifted 90° from each other as sum frequency light. A pair of photodetectors each convert the sum frequency light output from each of the pair of nonlinear optical members into an electrical signal. A signal processing unit adds the electrical signals output from the pair of photodetectors, processes the resultant electrical signal, and displays its pulse waveform. With this operation, the pulse waveform of the target light can be accurately measured regardless of variations in the polarized state of the target light.

12 Claims, 13 Drawing Sheets

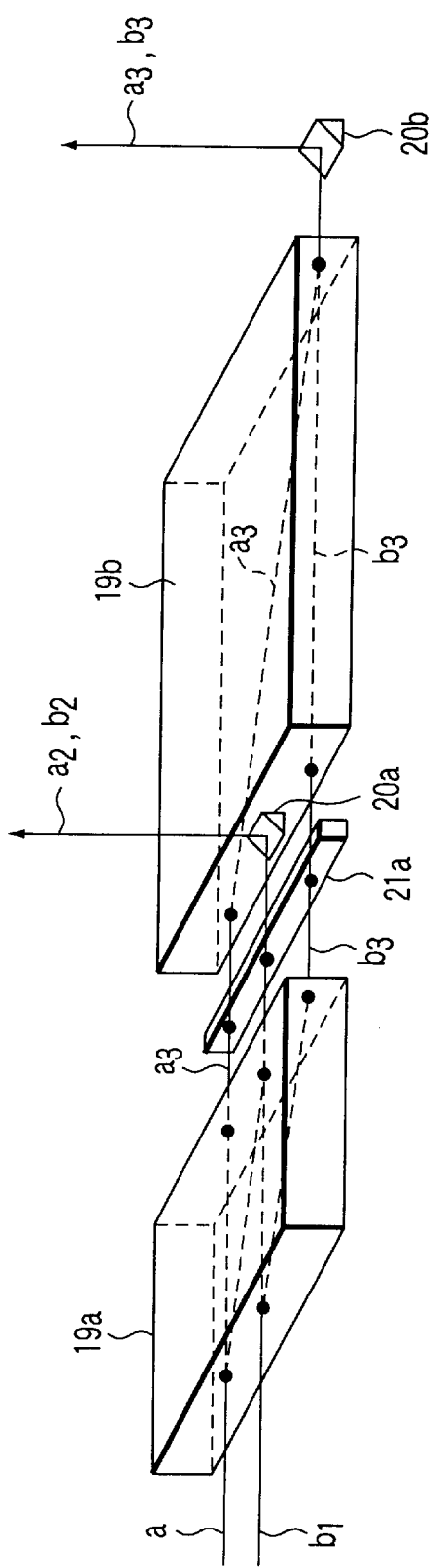
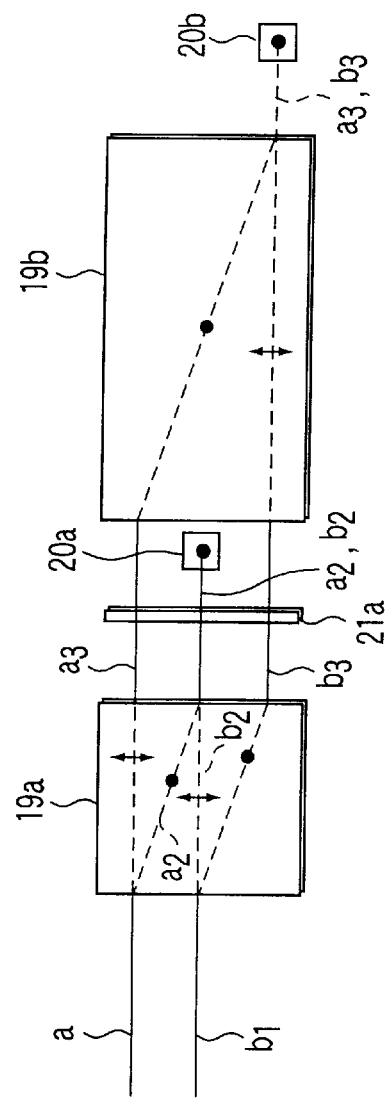
FIG. 12A
FIG. 12B

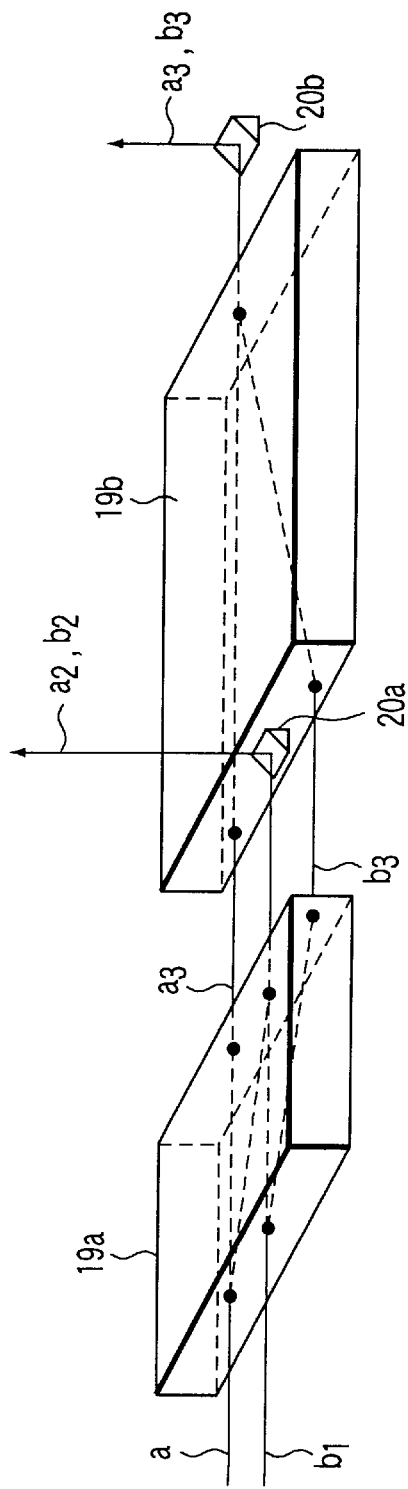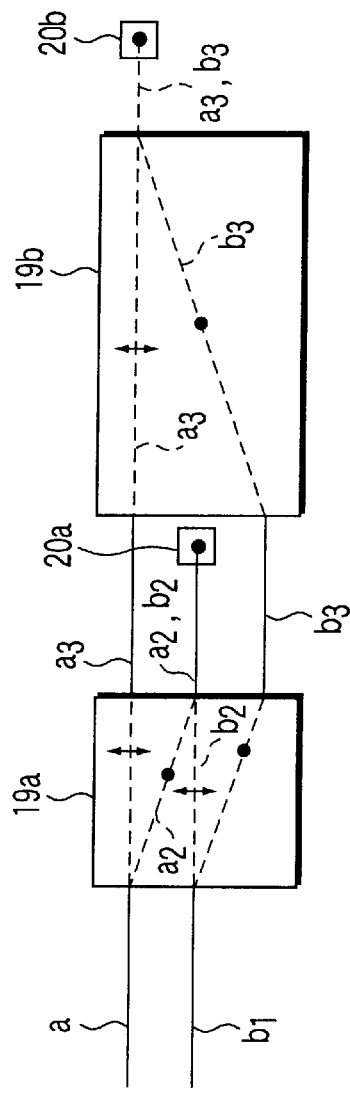
FIG. 14A
FIG. 14B

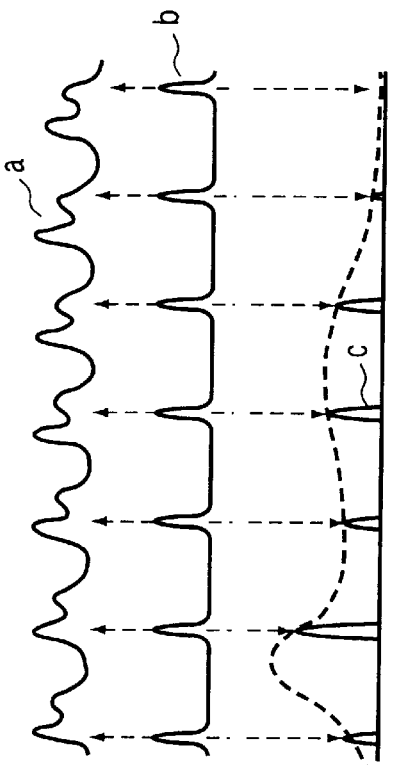
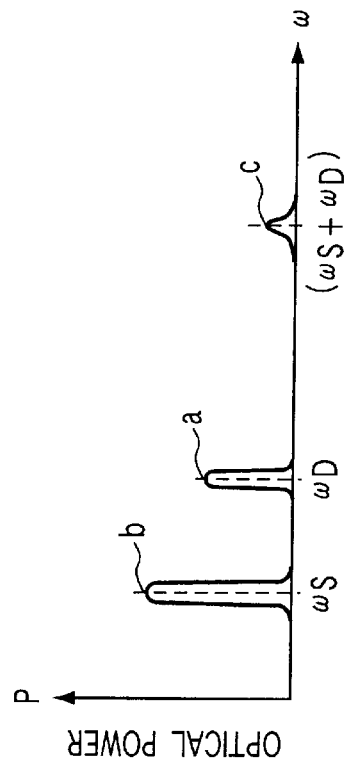
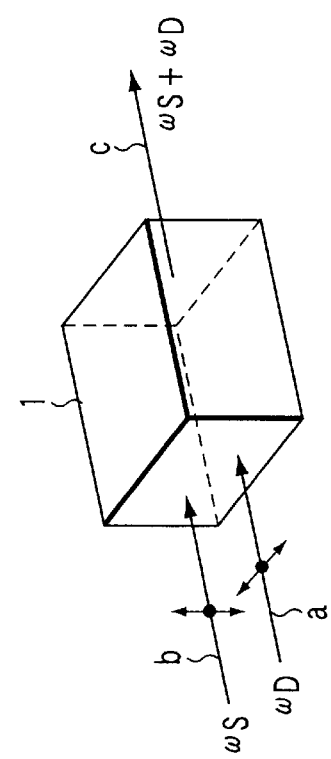
FIG. 15A (PRIOR ART) WAVEFORM OF TARGET LIGHT (fHz)
FIG. 15B (PRIOR ART) OPTICAL PULSE OF SAMPLING LIGHT (f−ΔfHz)
FIG. 15C (PRIOR ART) SUM FREQUENCY LIGHT (WAVEFORM OF CROSS-CORRELATION SIGNAL) (ΔfHz)
FIG. 16A (PRIOR ART)
FIG. 16B (PRIOR ART)

COMPLEMENTARY OPTICAL SAMPLING WAVEFORM MEASURING APPARATUS AND POLARIZATION BEAM SPLITTER WHICH CAN BE ASSEMBLED THEREIN

BACKGROUND OF THE INVENTION

The present invention relates to an optical sampling waveform measuring apparatus and, more particularly, to an optical sampling waveform measuring apparatus for measuring the pulse waveform of an optical signal used for optical communication or the like by using sum frequency light or sum frequency generation, and a polarization beam splitter which can be assembled in the measuring apparatus.

In constructing a new optical communication system, manufacturing a new optical transmission system, or periodically inspecting such an optical communication system or optical transmission system to check the quality of optical communication, it is important to measure the pulse waveform of a digital optical signal to be transmitted/received.

As a conventional technique of measuring the pulse waveform of such an optical signal, a technique of converting an optical signal including a pulse waveform into an electrical signal by using, e.g., a photoelectric converter, and displaying the pulse waveform converted into the electrical signal on the display screen of an oscilloscope is known.

Recently, with an increase in the transmission rate of information by means of optical signals, a high-speed optical transmission scheme with a transmission rate of 10 Gbit/s or more has been planned.

It is difficult to measure a high-speed optical signal exceeding several 10 Gbit/s with the response speed of an existing photoelectric converter for converting an optical signal into an electrical signal.

To solve this problem, an optical sampling waveform measuring apparatus for measuring the pulse waveform of an optical signal by using sum frequency light has been developed (Jpn. Pat. Appln. KOKOKU Publication No. 6-63869 which is published in Jpn. Pat. Appln. KOKAI Publication No. 2-311732).

FIGS. 15A, 15B, 15C, 16A, and 16B are views for explaining the principle of measurement by this optical sampling waveform measuring apparatus.

Assume that target light (to be measured) a having a pulse waveform to be measured and a repetition frequency f and sampling light b having a pulse width much smaller than that of the target light a and a repetition frequency (f−Δf) slightly lower (or higher) than the repetition frequency f of the target light a are incident on a nonlinear optical member 1 for type II phase matching (which is called type II, and hence will be referred to as type II hereinafter).

Sum frequency light c proportional to the product of the intensities of the light a and the light b is output from the nonlinear optical member 1 only when the light a and the light b incident on the nonlinear optical member 1 are simultaneously superimposed on the same optical axis of the nonlinear optical member 1.

The repetition frequency of this sum frequency light c is equal to the repetition frequency (f−Δf) of the sampling light b.

It therefore suffices if the response speed of the photoelectric converter used in this optical sampling waveform measuring apparatus is higher than this repetition frequency (f−Δf). In addition, since the time resolution is determined by the pulse width of the sampling light b, according to this optical sampling waveform measuring apparatus, the pulse waveform of the target light a which has broadened in the time axis direction can be accurately measured, as shown in FIGS. 15A, 15B, and 15C.

That is, as shown in FIG. 16A, when the target light a having an angular frequency $\omega_D$ and the sampling light b having an angular frequency $\omega_S$ are incident on one surface of the type II nonlinear optical member 1 in directions in which the planes of polarization of the light a and the light b are orthogonal to each other, sum frequency light c having a sum angular frequency $(\omega_S+\omega_D)$ is output from the other surface of the member 1 under the condition in which the light a and the light b are phase-matched.

FIG. 16B is a graph showing the relationship between angular frequencies ω and optical powers P of the target light a, the sampling light b, and the sum frequency light c.

Letting $P_{SFG}$ be the intensity of the sum frequency light c and $P_{SIG}$ and $P_{SAM}$ be the intensities of the target light a and the sampling light b, the intensity $P_{SFG}$ of the sum frequency light c is generally expressed by $$P_{SFG}=\eta \cdot P_{SIG} \cdot P_{SAM} \qquad (1)$$

where η is the nonlinear conversion efficiency constant that is uniquely determined by the type or material of the nonlinear optical member 1 used.

This nonlinear conversion efficiency constant η is generally as small as, for example, $10^{-5}$ to $10^{-4}$.

The optical sampling waveform measuring apparatus must therefore use a nonlinear optical member 1 whose nonlinear conversion efficiency constant η is large.

In the optical sampling waveform measuring apparatus, KDP ($KH_2PO_4$), LN ($LiNbO_3$), LT ($LiTaO_3$), KN ($KNbO_3$), or the like is used as the nonlinear optical member 1.

FIG. 17 is a block diagram showing the schematic arrangement of the optical sampling waveform measuring apparatus incorporating the type II nonlinear optical member 1 described above.

The externally input continuous target light a having the angular frequency $\omega_D$ and the pulse waveform repeating frequency f is controlled by a polarization direction controller 2 to have a plane of polarization in a 90° direction with respect to a reference direction (0° direction). The resultant light enters a multiplexer 3.

Meanwhile, a sampling light source 4 outputs the continuous sampling light b having the angular frequency $\omega_S$ different from the angular frequency $\omega_D$ of the target light a and the pulse waveform repeating frequency (f−Δf).

As shown in FIG. 15B, the pulse width of the sampling light b is set to be much smaller than that of the target light a.

The sampling light b output from the sampling light source 4 is controlled by a polarization direction controller 5 to have a plane of polarization, for example, in the reference direction (0° direction). The resultant light also enters the multiplexer 3.

The multiplexer 3 composed of, for example, a beam splitter (BS) and the like allows incident light to propagate straight and reflects incident light in a right-angle direction by using a half mirror 3a.

With this arrangement, the sampling light b having a plane of polarization in the reference direction (0° direction) and the target light a having a plane of polarization in a 90° direction with respect to the reference direction (0° direction) are simultaneously incident on one surface of the type II nonlinear optical member 1 that is placed on the optical axis of the sampling light b behind the multiplexer 3.

The sum frequency light c having the angular frequency $(\omega_S+\omega_D)$ is therefore output from the other surface of the type II nonlinear optical member 1.

The sum frequency light c output from the nonlinear optical member 1 is incident on a photodetector 7 through an optical filter 6.

Note that the sum frequency light c output from the nonlinear optical member 1 includes light components having angular frequencies $2\omega_S$ and $2\omega_D$ which are twice the angular frequencies $\omega_S$ and $\omega_D$, respectively, and unconverted light components having the angular frequencies $\omega_S$ and $\omega_D$, albeit slightly, in addition to a light component having the sum angular frequency $(\omega_S+\omega_D)$ of the angular frequencies $\omega_S$ and $\omega_D$ of the light b and the light a.

The optical filter 6 removes these light components having the angular frequencies $2\omega_S$, $2\omega_D$, $\omega_S$, and $\omega_D$.

The photodetector 7 is a photoelectric converter or the like and serves to convert the sum frequency light c into an electrical signal d and output it to an electrical signal processing system 8 on the next stage.

The electrical signal processing system 8 generates the optical pulse waveform of the target light a, which has broadened in the time axis direction, from the input electrical signal d having the same waveform as that of the sum frequency light c like the one shown in FIG. 15C by the method described above. The electrical signal processing system 8 then displays the resultant waveform on a display 9.

In the optical sampling waveform measuring apparatus shown in FIG. 17, however, the following problems are left unsolved.

The intensity $P_{SFG}$ of the sum frequency light c output from the type II nonlinear optical member 1 is expressed as the product of the intensity $P_{SAM}$ of the reference-direction (e.g., 0°-direction) light component of the sampling light input to the nonlinear optical member 1, the intensity $P_{SIG}$ of the light component in the 90° direction with respect to the reference direction of the target light a, and the nonlinear conversion efficiency η, as has been described with reference to equation (1).

That is, in this optical sampling waveform measuring apparatus shown in FIG. 17, when the plane of polarization of the sampling light b input to the nonlinear optical member 1 and the plane of polarization of the target light a are linearly polarized, and their planes of polarization are perfectly orthogonal to each other, the intensity $P_{SFG}$ of the sum frequency light c is maximized.

When, therefore, the optical pulse waveform of target light is to be stably measured with maximum sensitivity, the respective polarized states must be adjusted by the polarization direction controllers 2 and 5 to stabilize before measurement of the optical pulse waveform of the target light a so as to maximize the intensity $P_{SFG}$ of the sum frequency light c (satisfy the above condition).

In addition, since the distance between the sampling light source 4 and the polarization direction controller 5 is short, the polarized state of the sampling light b impinging on the polarization direction controller 5 varies slowly, and hence can be maintained constant within almost the measurement time.

If, however, the target light a is a signal sent through a long-distance single-mode optical fiber for a communication network or a signal sent through the interconnection in an optical communication device in an unstable temperature state, the polarized state of the light greatly varies with time and deviates from the state adjusted before measurement. This may cause variations in measured waveform within a short period of time.

After the start of measurement, therefore, when the polarized state of the target light a changes, the 90°-direction light component of the target light a output from the polarization direction controller 2 becomes small in amount unless the polarization direction controllers 2 and 5 are adjusted occasionally.

This means that the intensity $P_{SIG}$ of the target light a reflected by the half mirror 3a of the multiplexer 3 and input to the nonlinear optical member 1 varies. This leads to a deterioration in measurement precision for the optical pulse waveform of target light.

Although the polarized state of each light component can be adjusted occasionally after the start of measurement, it is impossible in practice to instantaneously determine whether the signal intensity has decreased or the polarized state has deviated. Furthermore, adjustment must be performed frequently during the measurement, making the apparatus impractical.

BRIEF SUMMARY OF THE INVENTION

The present invention has been made in consideration of the above situation, and has as its object to provide an optical sampling waveform measuring apparatus which can always accurately measure the pulse waveform of target light by complementary processing of splitting sampling light and target light in units of planes of polarization and separately obtaining sum frequency light even if the polarized state of the target light varies with time.

The present invention has been made in consideration of the above situation, and has as its another object to provide a polarization beam splitting unit which can be assembled in an optical sampling waveform measuring apparatus which can always accurately measure the pulse waveform of target light by complementary processing of splitting sampling light and target light in units of planes of polarization and separately obtaining sum frequency light even if the polarized state of the target light varies with time.

In order to achieve the above objects, according to the first aspect of the present invention, there is provided an optical sampling waveform measuring apparatus for measuring a pulse waveform of target light, comprising:

a sampling light source for generating a pulse sequence of sampling light that can be split into a polarized light component in a 0° direction and a polarized light component in a 90° direction both with respect to a reference direction;

a polarization beam splitting unit for receiving sampling light output from the sampling light source and the target light, splitting each of the sampling light and the target light into a polarized light component in a 0° direction and a polarized light component in a 90° direction both with respect to the reference direction, and outputting the 0°-direction polarized light component of the sampling light and the 90°-direction polarized light component of the target light, as first output light, and the 90°-direction polarized light component of the sampling light and the 0°-direction polarized light component of the target light, as second output light, to first and second optical paths, respectively;

a first nonlinear optical member for performing type II phase matching to generate a cross-correlation signal of the sampling light and the target light output to the first optical path as sum frequency light;

a second nonlinear optical member for performing type II phase matching to generate a cross-correlation signal of the sampling light and the target light output to the second optical path as sum frequency light;

a first photodetector for converting the sum frequency light output from the first nonlinear optical member into an electrical signal;

a second photodetector for converting the sum frequency light output from the second nonlinear optical member into an electrical signal; and a signal processing section for adding the electrical signals output from the first and second photodetectors, and processing the resultant electrical signal to generate an optical pulse waveform of the target light.

According to the second aspect of the present invention, there is provided a polarization beam splitting unit comprising:

a pair of calcite members for respectively splitting incident first light and incident second light into two light components having planes of polarization shifted 90° from each other;

a ½ wave plate for rotating polarized states of the two light components, output from one of the pair of calcite members and having planes of polarization shifted 90° from each other, through 90°; and a pair of focusing lenses for focusing/multiplexing the first light and the second light output from the other of the pair of calcite members and the ½ wave plate and having planes of polarization shifted 90° from each other.

According to the third aspect of the present invention, there is provided a polarization beam splitting unit, comprising:

a first calcite member for receiving first light and second light and outputting three light components including multiplexed light of first and second light components having planes of polarization shifted 90° from each other and first and second light components having planes of polarization shifted 90° from each other;

a ½ wave plate for rotating polarized states of the three light components, output from the first calcite member, through 90°; and a second calcite member for multiplexing and outputting first and second light components output from the ½ wave plate and having planes of polarization shifted 90° from each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 12A and 12B are a perspective view and a plan view, respectively, showing the schematic arrangement of the polarization beam splitting unit assembled in an optical sampling waveform measuring apparatus according to the seventh embodiment of the present invention;

FIGS. 14A and 14B are a perspective view and a plan view, respectively, showing the schematic arrangement of the polarization beam splitting unit assembled in an optical sampling waveform measuring apparatus according to the ninth embodiment of the present invention;

FIGS. 15A, 15B, and 15C are timing charts for explaining the principle of measurement of the optical pulse waveform of an optical signal using sum frequency light;

FIGS. 16A and 16B are views for explaining the optical characteristics of a nonlinear optical member of type II.

DETAILED DESCRIPTION OF THE INVENTION

Figure 1:
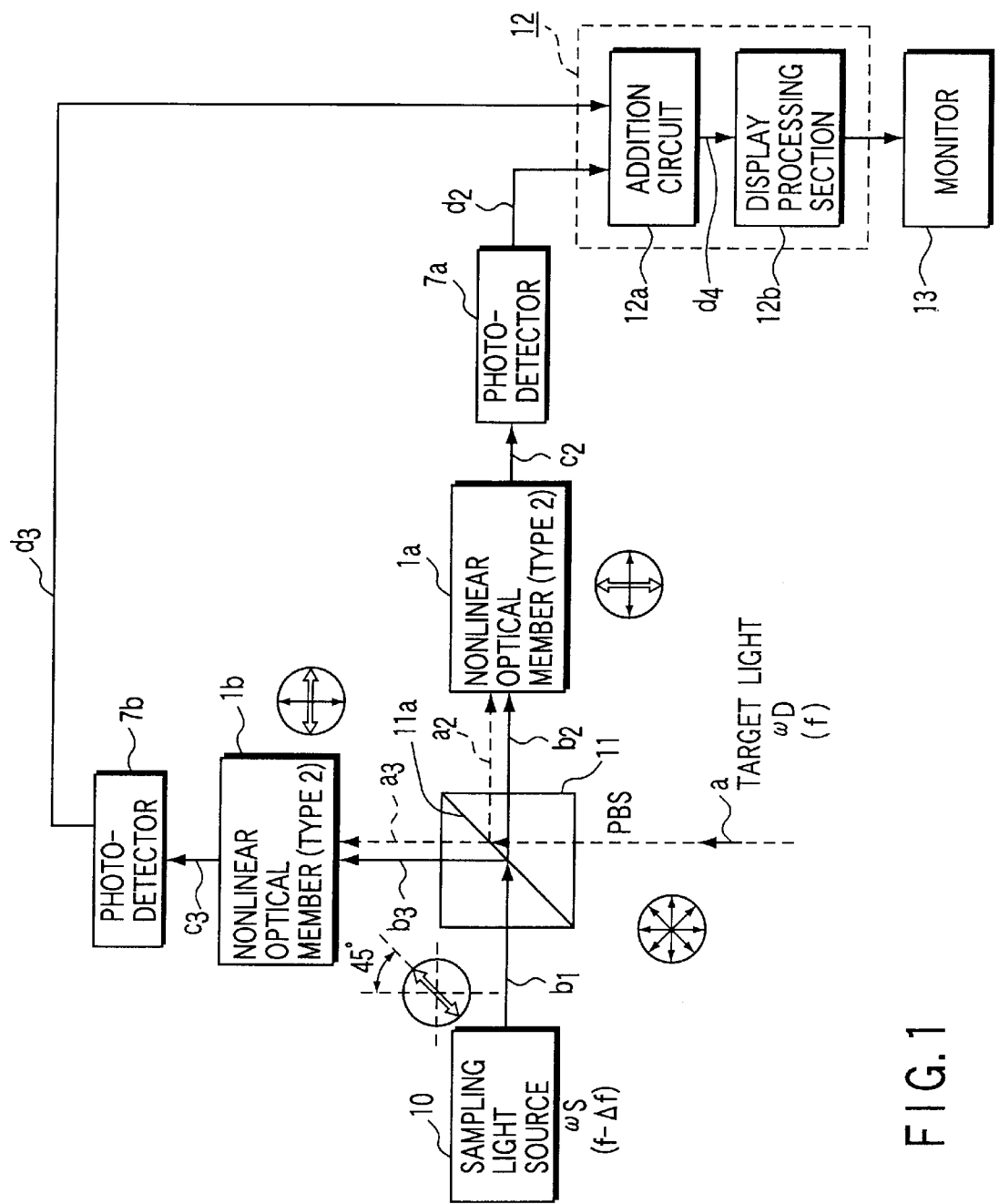
FIG. 1 is a block diagram showing the schematic arrangement of an optical sampling waveform measuring apparatus according to the first embodiment of the present invention.

Reference will now be made in detail to the presently preferred embodiments of the invention as illustrated in the accompanying drawings, in which like reference characters designate like or corresponding parts throughout the several drawings.

A brief description of the present invention will be given first.

In order to solve the above problems, the first optical sampling waveform measuring apparatus of the present invention includes a sampling light source for generating a pulse sequence of sampling light having a pulse width smaller than that of target light and a narrow single plane of polarization, a polarization beam splitting unit for splitting each of the sampling light, output from the sampling light source, and the target light into two light components having planes of polarization shifted 90° from each other, multiplexing each pair of sampling and target light components having planes of polarization shifted 90° from each other, and outputting the two combinations of multiplexed light components to different optical paths, a pair of nonlinear optical members capable of performing type II phase matching to generate a cross-correlation signal based on the sampling and target light components output to each optical path and having planes of polarization shifted 90° from each other as sum frequency light, a pair of photodetectors each serving to convert the sum frequency light output from each nonlinear optical member into an electrical signal, and a signal processing section for adding the electrical signals output from the respective photodetectors, processing the resultant electrical signal, and displaying the optical pulse waveform of the target light.

According to the polarization beam splitting unit assembled in the optical sampling waveform measuring apparatus having this arrangement, since each of incident sampling light and incident target light is split into two light components having planes of polarization shifted 90° from each other, a total of four light components are output.

In addition, the four sampling and target light components are multiplexed into two combinations of light components, each having planes of polarization which are orthogonal to each other (e.g., a combination of a sampling light component having a plane of polarization in a reference direction and a target light component having a plane of polarization in a 90° direction with respect to the reference direction, and a combination of a target light component in the reference direction and a sampling light component having a plane of polarization in a 90° direction with respect to the reference direction). These combinations of light components are output to different optical paths.

The combination of multiplexed sampling and target light components output from each optical path and having the planes of plane of polarization shifted 90° from each other is incident on a corresponding one of the pair of nonlinear optical members to be output as independent sum frequency light.

Each sum frequency light is converted into an electrical signal by a corresponding photodetector. The electrical signals are then added to obtain the optical pulse waveform of the target light.

In this arrangement, therefore, even if the polarized state of the target light changes, although the intensity of the target light component output from one optical path of the polarization beam splitting unit decreases, the intensity of the target light component output from the other optical path increases. With this complementary operation, an increase/decrease in the intensity of each sum frequency light due to variations in the polarized state of the target light is canceled out, and the electrical signal obtained by adding the sum frequency light includes almost no variations. This allows accurate measurement of the optical pulse waveform of the target light.

The second optical sampling waveform measuring apparatus of the present invention includes a sampling light source for generating a pulse sequence of sampling light having a pulse width smaller than that of target light, a polarization control section for controlling the plane of polarization of the sampling light output from the sampling light source to a specific direction, a polarization beam splitting unit for splitting each of the sampling light output from the polarization control section and the target light into two light components having planes of polarization shifted 90° from each other, multiplexing each pair of sampling and target light components having planes of polarization shifted 90° from each other, and outputting the resultant two combinations of multiplexed light components to different optical paths, a pair of nonlinear optical members capable of performing type II phase matching to generate a cross-correlation signal based on the sampling and target light components output to each optical path and having planes of polarization shifted 90° from each other as sum frequency light, a pair of photodetectors each serving to convert the sum frequency light output from each nonlinear optical member into an electrical signal, and a signal processing section for adding the electrical signals output from the respective photodetectors, processing the resultant electrical signal, and displaying the optical pulse waveform of the target light.

In the optical sampling waveform measuring apparatus having this arrangement, the polarization control section for controlling the polarized state of sampling light is interposed between the sampling light source and the polarization beam splitting unit.

With this arrangement, when sampling light is split into two light components having planes of polarization orthogonal to each other, the intensities of the resultant two light components can be set to be equal regardless of the polarized state of the sampling light.

In this arrangement, therefore, even if the polarized state of the target light changes, although the intensity of the target light component output from one optical path of the polarization beam splitting unit decreases, the intensity of the target light component output from the other optical path increases. With this complementary operation, an increase/decrease in the intensity of each sum frequency light due to variations in the polarized state of the target light is canceled out, and the electrical signal obtained adding the sum frequency light includes almost no variations. This allows accurate measurement of the optical pulse waveform of the target light.

The third optical sampling waveform measuring apparatus of the present invention includes a sampling light source for generating a pulse sequence of sampling light having a pulse width smaller than that of target light and a single plane of polarization, a polarization beam splitting unit for splitting each of the sampling light, output from the sampling light source, and the target light into two light components having planes of polarization shifted 90° from each other, multiplexing each pair of sampling and target light components having planes of polarization shifted 90° from each other, and outputting the two combinations of multiplexed light components to different optical paths, a pair of nonlinear optical members capable of performing type II phase matching to generate a cross-correlation signal based on the sampling and target light components output to each optical path and having planes of polarization shifted 90° from each other as sum frequency light, a pair of photodetectors each serving to convert the sum frequency light output from each nonlinear optical member into an electrical signal, and a signal processing section for weighting the electrical signals output from the respective photodetectors in accordance with the direction of the plane of polarization of the sampling light incident on the polarization beam splitting unit, adding the weighted electrical signals, and processing the resultant electrical signal to display the optical pulse waveform of the target light.

In the optical sampling waveform measuring apparatus having this arrangement, even if the polarized state of the target light varies, variations in measurement result can be prevented by correcting the electrical signals output from the respective photodetectors in the electrical stage in accordance with the splitting ratio in the polarization beam splitting unit before addition of the signals.

In the fourth optical sampling waveform measuring apparatus of the present invention, a pair of optical filters each having a passband set to the frequency range of sum frequency light are inserted between the respective nonlinear optical members and the respective photodetectors.

As described above, the light output from each nonlinear optical member includes a light component having a sum angular frequency of the frequencies of the target light and the sampling light, a light component having a frequency twice each angular frequency based on a small polarization extinction ratio, and sampling and target light components passing through the nonlinear optical member without being converted into sum frequency light.

The pair of optical filters are therefore used to extract only sum frequency component by cutting these unnecessary components.

The fifth optical sampling waveform measuring apparatus of the present invention includes a sampling light source for generating a pulse sequence of sampling light having a pulse width smaller than that of target light, a polarization control section for controlling the plane of polarization of the sampling light output from the sampling light source to a specific direction, a polarization beam splitting unit for splitting each of the sampling light output from the polarization control section and the target light into two light components having planes of polarization shifted 90° from each other, multiplexing each pair of sampling and target light components having planes of polarization shifted 90° from each other, and outputting the resultant two combinations of multiplexed light components to different optical paths, a pair of nonlinear optical members capable of performing type II phase matching to generate a cross-correlation signal based on the sampling and target light components output to each optical path and having planes of polarization shifted 90° from each other as sum frequency light, a pair of photodetectors each serving to convert the sum frequency light output from each nonlinear optical member into an electrical signal, a pair of optical filters inserted between the respective nonlinear optical members and the respective photodetectors and having a passband set to the frequency range of sum frequency light, and a signal processing section for weighting the electrical signals output from the respective photodetectors in accordance with the direction of the plane of polarization of the sampling light incident on the polarization beam splitting unit, adding the weighted electrical signals, and processing the resultant electrical signal to display the optical pulse waveform of the target light.

All the functions described above are added to the optical sampling waveform measuring apparatus having this arrangement.

In the sixth optical sampling waveform measuring apparatus of the present invention, a polarization beam splitting unit includes a pair of calcite members for respectively splitting incident sampling light and incident target light into two light components having planes of polarization shifted 90° from each other, a ½ wave plate for rotating polarized states of the two light components, output from one of the pair of calcite members and having planes of polarization shifted 90° from each other, through 90°, and a pair of focusing lenses for focusing/multiplexing the sampling light and the target light output from the other of the pair of calcite members and the ½ wave plate and having planes of polarization shifted 90° from each other.

In the seventh optical sampling waveform measuring apparatus of the present invention, a polarization beam splitting unit includes a first calcite member for receiving sampling light and target light and outputting three light components including multiplexed light of sampling and target light components having planes of polarization shifted 90° from each other and sampling and target light components having planes of polarization shifted 90° from each other, a ½ wave plate for rotating polarized states of the three light components, output from the first calcite member, through 90°, and a second calcite member for multiplexing and outputting sampling and target light components output from the ½ wave plate and having planes of polarization shifted 90° from each other.

The polarization beam splitting unit can be easily built by combining a plurality of calcite members each having a physical property of splitting incoming light into two light components having planes of polarization shifted 90° from each other in this manner.

By inserting the ½ wave plate in the optical path, the optical path lengths of the respective light components incident on the focusing lens, which multiplexes sampling and target light components having planes of polarization shifted 90° from each other, and on the second calcite member can be easily set to be equal to each other.

The first polarization beam splitting unit of the present invention includes a pair of calcite members for respectively splitting incident first light and incident second light into two light components having planes of polarization shifted 90° from each other, a ½ wave plate for rotating polarized states of the two light components, output from one of the pair of calcite members and having planes of polarization shifted 90° from each other, through 90°, and a pair of focusing lenses for focusing/multiplexing the first light and the second light output from the other of the pair of calcite members and the ½ wave plate and having planes of polarization shifted 90° from each other.

The polarization beam splitting unit according to claim 9 includes a first calcite member for receiving first light and second light and outputting three light components including multiplexed light of first and second light components having planes of polarization shifted 90° from each other and first and second light components having planes of polarization shifted 90° from each other, a ½ wave plate for rotating polarized states of the three light components, output from the first calcite member, through 90°, and a second calcite member for multiplexing and outputting first and second light components output from the ½ wave plate and having planes of polarization shifted 90° from each other.

The second polarization beam splitting unit of the present invention includes a first calcite member for splitting each of incident first light and incident second light into two light components having planes of polarization shifted 90° from each other, and a second calcite member for multiplexing the four light components output from the first calcite member into two combinations of first and second light components, each having planes of polarization shifted 90° from each other, and outputting the two combinations of light components to different optical paths.

The third polarization beam splitting unit of the present invention includes a first calcite member for receiving first light and second light and outputting three light components including multiplexed light of first and second light components having planes of polarization shifted 90° from each other and first and second light components having planes of polarization shifted 90° from each other, and a second calcite member for multiplexing the first and second light components output from the first calcite member and having planes of polarization shifted 90° from each other, and outputting the resultant light.

As described above, each of the first to third polarization beam splitting units of the present invention can be easily constructed by properly combining a plurality of calcite members, each having a physical property of splitting incoming light into two light components having planes of polarization shifted 90° from each other, a ½ wave plate, focusing lenses, and the like. This polarization beam splitting unit can be used in various optical apparatuses other than the optical sampling waveform measuring apparatus described above.

The embodiments of the optical sampling waveform measuring apparatus and the polarization beam splitting unit of the present invention based on the above brief description will be described next with reference to the accompanying drawings.

(First Embodiment)

FIG. 1 is a block diagram showing the schematic arrangement of an optical sampling waveform measuring apparatus according to the first embodiment of the present invention.

Figure 17:
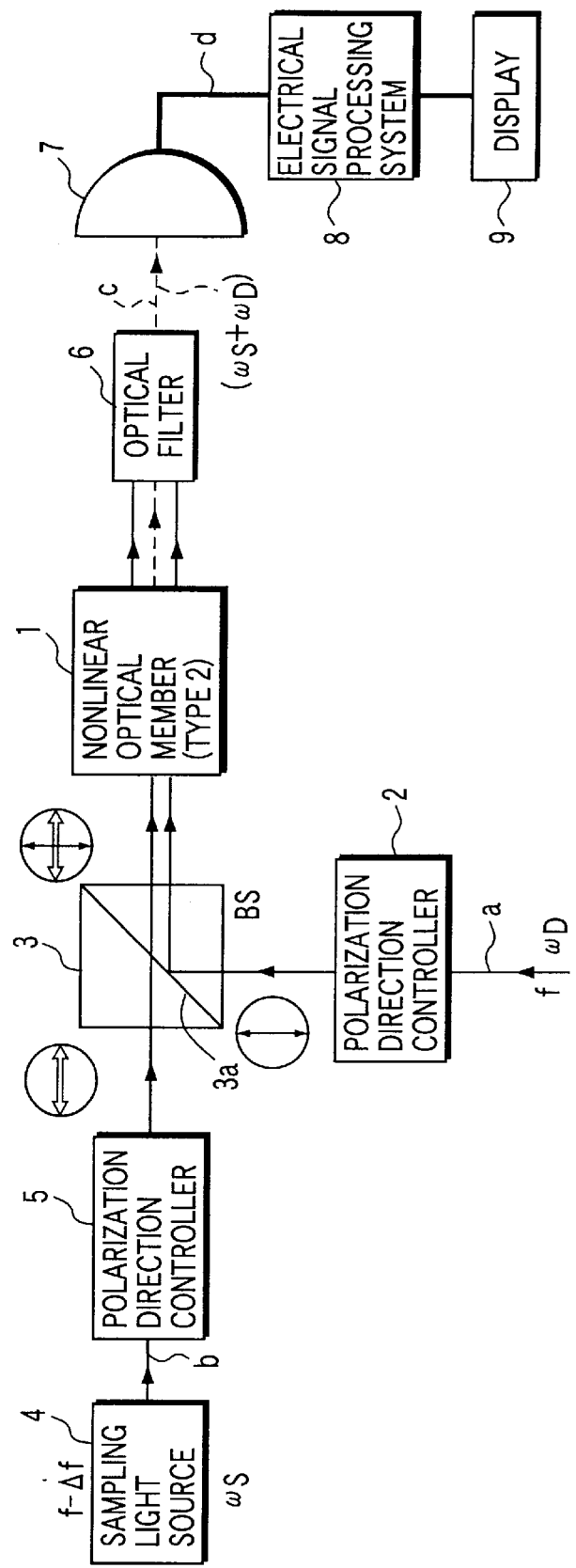
FIG. 17 is a block diagram showing the schematic arrangement of a conventional optical sampling waveform measuring apparatus.

The same reference numerals in FIG. 1 denote the same parts of the conventional optical sampling waveform measuring apparatus shown in FIG. 17, and a repetitive description will be avoided.

In this optical sampling waveform measuring apparatus, a polarization beam splitting unit 11, a nonlinear optical member 1$a$, and a photodetector 7$a$ are placed on the optical path of sampling light $b_1$ output from a sampling light source 10, and the polarization beam splitting unit 11, a nonlinear optical member 1$b$, and a photodetector 7$b$ are placed on the optical path of target light $\underline{a}$ that is input externally.

This apparatus also includes a signal processing section 12 constituted by an addition circuit 12$a$ and a display processing section 12$b$, which process the electrical signals output from the photodetectors 7$a$ and 7$b$, and a monitor 13.

The operation of each component will be described in detail next.

The externally input continuous target light $\underline{a}$ having an angular frequency $\omega_D$ and a pulse waveform repeating frequency $\underline{f}$ is incident on the polarization beam splitting unit 11.

Meanwhile, the sampling light source 10 outputs continuous sampling light $b_1$ having an angular frequency $\omega_S$ different from the angular frequency $\omega_D$ of the target light $\underline{a}$ and a pulse waveform repeating frequency (f−Δf).

The pulse width of the sampling light $b_1$ is set to be much smaller than that of the target light $\underline{a}$.

As shown in FIG. 1, the sampling light $b_1$ has a single plane of polarization in a 45° direction with respect to a reference direction (0° direction).

The sampling light $b_1$ output from the sampling light source 10 is directed to the polarization beam splitting unit 11.

The polarization beam splitting unit 11 composed of, for example, a polarization beam splitter (PBS) and the like incorporates a half mirror 11$a$ whose surface is covered with a polarization coating.

This half mirror 11$a$ transmits a polarized light component, of the incident light, which travels in a 90° direction with respect to the reference direction (0° direction), but reflects a polarized light component, of the incident light, which travels in the reference direction (0° direction).

A 90°-direction polarized light component $b_2$ of the sampling light $b_1$ output from the sampling light source 10 and having a plane of polarization in an almost 45° direction and a reference-direction (0°-direction) polarized light component $a_2$ of the target light $\underline{a}$ enter the type II nonlinear optical member 1$a$.

A reference-direction polarized light component $b_3$ of the sampling light $b_1$ and a 90°-direction polarized light component $a_3$ of the target light $\underline{a}$ are incident on the nonlinear optical member 1$b$ of type II in an optical path different from the one in which the nonlinear optical member 1$a$ is located.

Since the sampling light $b_2$ and the target light $a_2$ whose planes of polarization are set in directions shifted 90° from each other are input to the nonlinear optical member 1$a$, they satisfy the phase matching condition. As a result, sum frequency light $c_2$ having an angular frequency ($\omega_S+\omega_D$) is output from the type II nonlinear optical member 1$a$ to the photodetector 7$a$.

Similarly, since the sampling light $b_3$ and the target light $a_3$ whose planes of polarization are set in directions shifted 90° from each other are input to the nonlinear optical member 1$b$, they satisfy the phase matching condition. As a result, sum frequency light $c_3$ having the angular frequency ($\omega_S+\omega_D$) is output from the nonlinear optical member 1$b$ to the photodetector 7$b$.

The photodetectors 7$a$ and 7$b$ respectively convert the incident sum frequency light $c_2$ and the incident sum frequency light $c_3$ into electrical signals $d_2$ and $d_3$ and transmit them to the signal processing section 12.

The electrical signals $d_2$ and $d_3$ input to the signal processing section 12 are added together by the addition circuit 12$a$, and the resultant signal is input as a new electrical signal $d_4$ to the display processing section 12$b$.

The display processing section 12$b$ performs envelope detection for the electrical signal $d_4$ obtained by addition to obtain the optical pulse waveform of the target light $\underline{a}$, and outputs it to the monitor 13.

In the optical sampling waveform measuring device having this arrangement, the plane of polarization of the sampling light $b_1$ output from the sampling light source 10 is in nearly 45° direction with respect to the reference direction, and the half mirror 11$a$ of the polarization beam splitting unit 11 is set in nearly 45° direction with respect to the optical paths of the sampling light $b_1$ and the target light $\underline{a}$. For this reason, the intensity of transmitted light is roughly equal to that of reflected light in the polarization beam splitting unit 11.

That is, of the sampling light $b_1$ split by the polarization beam splitting unit 11, the polarized light component $b_3$ in the reference direction and the polarized light component $b_2$ in a 90° direction with respect to the reference direction have nearly equal intensity.

Since the polarized state of the target light $\underline{a}$ varies due to disturbances, the intensity of the target light $a_2$ output from the polarization beam splitting unit 11 and having a plane of polarization in the reference direction may differ from that of the target light $a_3$ having a plane of polarization in a 90° direction with respect to the reference direction.

For this reason, if the target light $a_2$ (or $a_3$) whose intensity has varied above its normal intensity is incident on the nonlinear optical member 1$a$ (or 1$b$), the sum frequency light $c_2$ (or $c_3$) emerging from this member has an intensity higher than the normal intensity.

If target light $a_3$ (or $a_2$) whose intensity has varied below its normal intensity is incident on the nonlinear optical member 1b (or 1a), the sum frequency light $c_3$ (or $c_2$) leaving this member has an intensity lower than the normal intensity.

The intensities of the sum frequency light $c_2$ and the sum frequency light $c_3$ output from the nonlinear optical members 1a and 1b therefore vary in accordance with the polarized state of the target light a.

The electrical signal $d_4$, which is the sum of the electrical signals $d_2$ and $d_3$ obtained by photoelectrically converting the sum frequency light $c_2$ and the sum frequency light $c_3$ using the photodetectors 7a and 7b, is essentially a signal obtained by branching the single target light a. For this reason, the electrical signals $d_2$ and $d_3$ interact with each other in a complementary manner, and hence changes in measured pulse waveform due to variations in the polarized state of the target light a are canceled out.

That is, since the electrical signal $d_4$ obtained by adding the electrical signals $d_2$ and $d_3$ is stable, the display processing section 12b can display/measure with a high precision regardless of the polarized state of the pulse waveform of the target light a.

The first embodiment shown in FIG. 1 is based on the premise that a splitting ratio n of the sampling light $b_1$ in the polarization beam splitting unit 11 is almost 1:1 (i.e., n=0.5).

However, the splitting ratio n of the sampling light $b_1$ in the polarization beam splitting unit 11 is not always limited to 1:1 (i.e., n=0.5).

The actual influence of the splitting ratio n of the sampling light $b_1$ on waveform measurement will be quantitatively described below.

Letting $P_{SIG}$ and $P_{SAM}$ be the intensities of the target light a and the sampling light $b_1$ input to the nonlinear optical member 1a (1b) and having planes of polarization that are orthogonal to each other, an intensity $P_{SFG}$ of the sum frequency light $c_2$ ($c_3$) output from the nonlinear optical member 1a (1b) which gives type II phase matching is given by $$P_{SFG} = \eta \cdot P_{SIG} \cdot P_{SAM} \quad (2)$$

where $\eta$ is a nonlinear conversion efficiency constant.

Letting $n \cdot P_{SAM}$ be the intensity of the 90°-direction polarized light component $b_2$, of the sampling light $b_1$, which is transmitted through the half mirror 11a, and $(1-n) \cdot P_{SAM}$ (where $0 \leq n \leq 1$) be the intensity of the reference-direction polarized light component $b_3$, of the sampling light $b_1$, which is reflected by the half mirror 11a, the light intensity $P_{SAM}$ can be expressed as $$P_{SAM} = <<nP_{SAM}>>_{90} + <<(1-n)P_{SAM}>>_{0} \quad (3)$$

where $<<>>_{90}$ is the light intensity in a 90° direction, and $<<>>_0$ is the light intensity in the reference direction (0° direction).

Similarly, letting $m \cdot P_{SIG}$ be the intensity of the reference-direction polarized light component $a_2$, of the target light a, which is reflected by the half mirror 11a, and $(1-m) \cdot P_{SIG}$ (where $0 \leq m \leq 1$) be the intensity of the 90°-direction polarized light component $a_3$, of the target light a, which is transmitted through the half mirror 11a, assuming that the polarized state of the target light a varies, the light intensity $P_{SIG}$ can be expressed as $$P_{SIG} = <<mP_{SIG}>>_0 + >>(1-m)P_{SIG}>>_{90} \quad (4)$$

where $<<>>_{90}$ is the light intensity in a 90° direction, and $<<>>_0$ is the light intensity in the reference direction (0° direction).

From equations (2), (3), and (4), we have:

$$P_{SFG} = \eta \cdot \{<<nP_{SAM} \cdot mP_{SIG}>>_{90} + <<(1-n) \cdot (1-m) \cdot P_{SAM} \cdot P_{SIG}>>_0\} \quad (5)$$

In this case, since the nonlinear conversion efficiency $\eta$ is a constant, extracting only the essential terms and rearranging the equation associated with the light intensity $P_{SFG}$ obtained by adding the intensities of the sum frequency light $c_2$ and the sum frequency light $C_3$ yields:

$$P_{SFG} (2\,nm - n - m + 1) P_{SAM} \cdot P_{SIG} \quad (6)$$

Figure 2A:
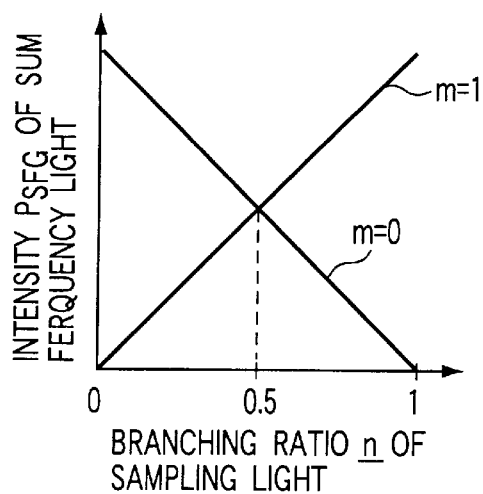
FIGS. 2A and 2B are graphs for explaining the relationship between the intensity of the sum frequency light output from a polarization beam splitting unit and the splitting ratio of incident light.

FIG. 2A is a graph showing changes in the light intensity as the sum of the intensities of the sum frequency light $c_2$ and the sum frequency light $c_3$, obtained when m is fixed to 0 or 1 and n changes from 0 to 1, according to mathematical expression (6) in the above method of the present invention.

Figure 2B:
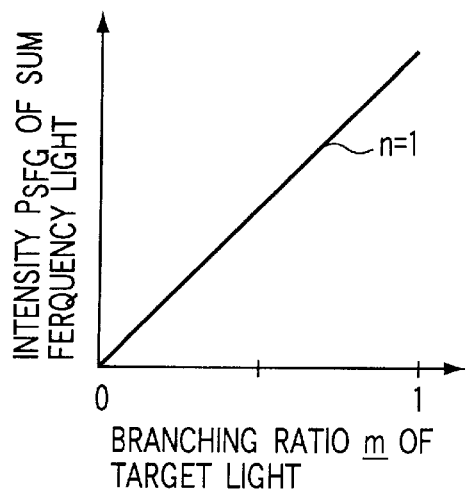

FIG. 2B is a graph showing changes in the sum frequency light intensity obtained when only sampling light having a plane of polarization in the reference direction (or a direction shifted 90° from the reference direction) is used as in the conventional method, i.e., n is fixed to 1 (or 0) and m changes from 0 to 1.

Referring to FIG. 2A, as n or m changes, the sum frequency light intensity $P_{SFG}$ as the sum of the intensities of the sum frequency light $c_2$ and the sum frequency light $c_3$ greatly varies.

On the other hand, as is obvious from FIG. 2A, according to the method of the present invention, there is a point where the light intensity $P_{SFG}$ as the sum of the intensities of the sum frequency light $c_2$ and the sum frequency light $c_3$ remains constant as long as n stays in the neighborhood of 0.5 (the splitting ratio in the polarization beam splitting unit is 1:1) regardless of changes in m, i.e., changes in the polarized state of the target light.

According to the conventional method, however, as is obvious from FIG. 2B, there is no such a point, and hence it is difficult to prevent variations in measured waveform due to variations in polarized state.

The present invention is therefore based on the premise that the splitting ratio n in the polarization beam splitting unit 11 is approximately 1:1 (i.e., n=0.5). As can be seen from FIG. 1, the optical pulse waveform of the target light a can be measured with high precision, without being influenced by the polarized state of the target light a, by adding the intensities of the sum frequency light $c_2$ and the sum frequency light $c_3$ respectively output from the two nonlinear optical members 1a and 1b.

As described above, in the optical sampling waveform measuring apparatus according to the first embodiment shown in FIG. 1, the optical pulse waveform of the target light a can be measured with high precision without being influenced by the polarized state of the target light a for the above reason.

The splitting ratio n of the sampling light $b_1$ in the polarization beam splitting unit 11 is not limited to around 1:1 (i.e., n=0.5). This will be clearly described below with reference to FIGS. 3 to 5.

Figure 3:
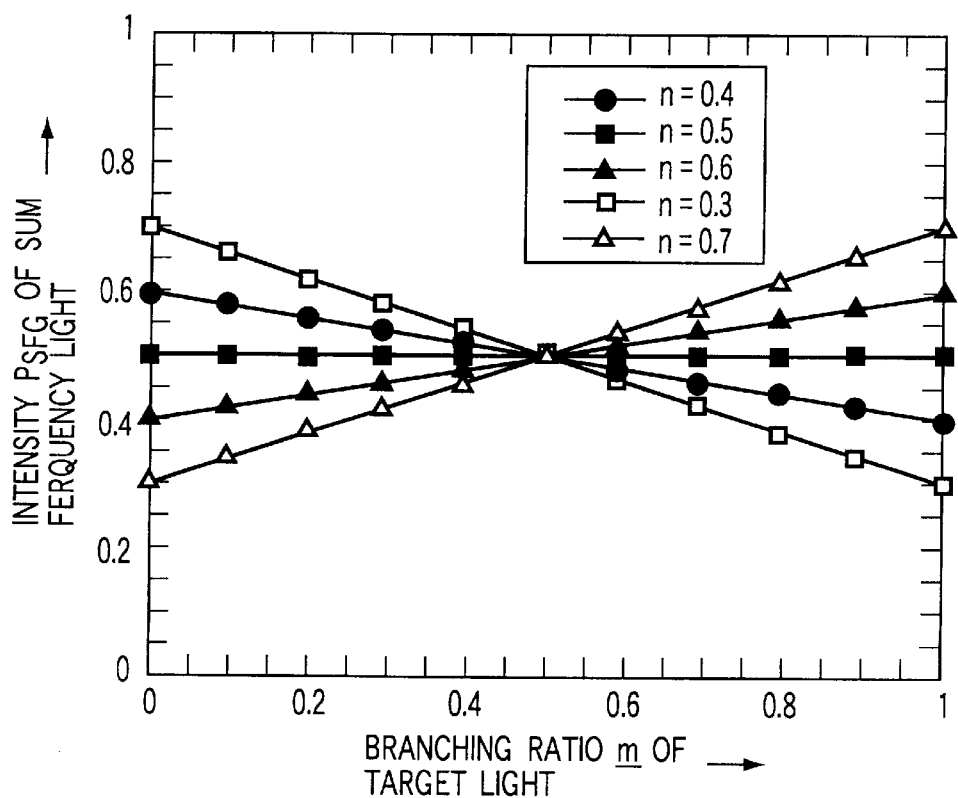
FIG. 3 is a graph showing the relationship between the intensity of sum frequency light and the splitting ratio of target light using the splitting ratio of sampling light as a parameter.

FIG. 3 is a graph of the light intensity $P_{SFG}$ as the sum of the intensities of the sum frequency light $c_2$ and the sum frequency light $c_3$ which is calculated and plotted according to mathematical expression (6) when m changes from 0 to 1, i.e., the minimum value to the maximum value, with respect to n (0.4 to 0.7).

As is obvious from FIG. 3, when n=0.5, the light intensity $P_{SFG}$ is constant regardless of the value of m. In contrast to this, when n=0.3, n=0.4, n=0.6, and n=0.7, the light intensity $P_{SFG}$ varies in accordance with the value of m.

Even if the light intensity $P_{SFG}$ varies, no practical problem is posed as long as the variations fall within the allowable range in actual measurement of the pulse waveform of target light.

Figure 4:
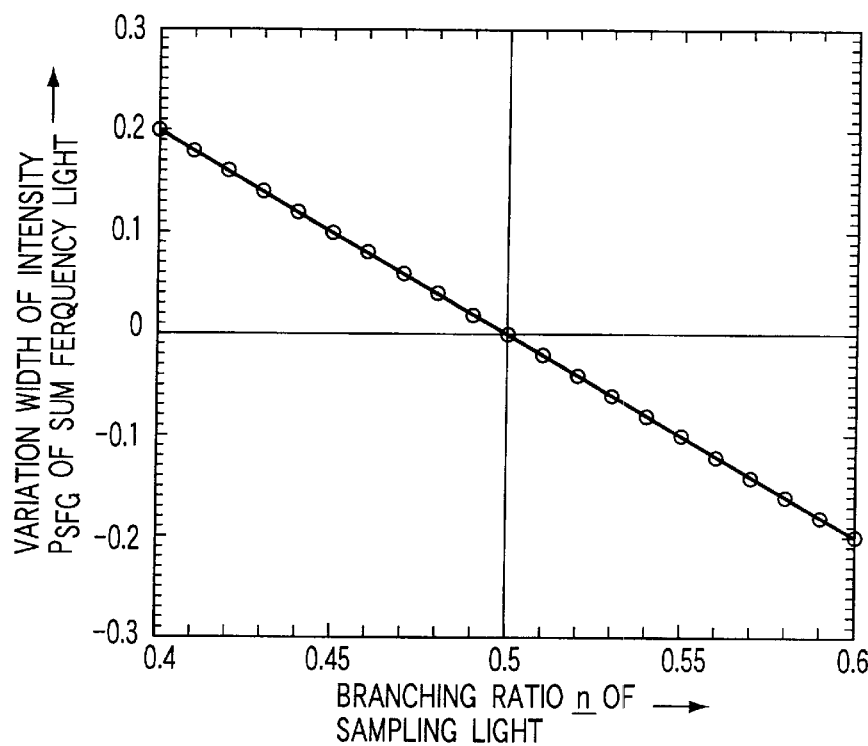
FIG. 4 is a graph showing the relationship between the variation width of the intensity of sum frequency light and the splitting ratio of sampling light.

FIG. 4 is a graph of the variation width of the light intensity $P_{SFG}$ as the sum of the sum frequency light $c_2$ and the sum frequency light $c_3$ which is calculated and plotted when n is fixed to the range of 0.4 to 0.6, and m changes from 0 to 1.

Figure 5:
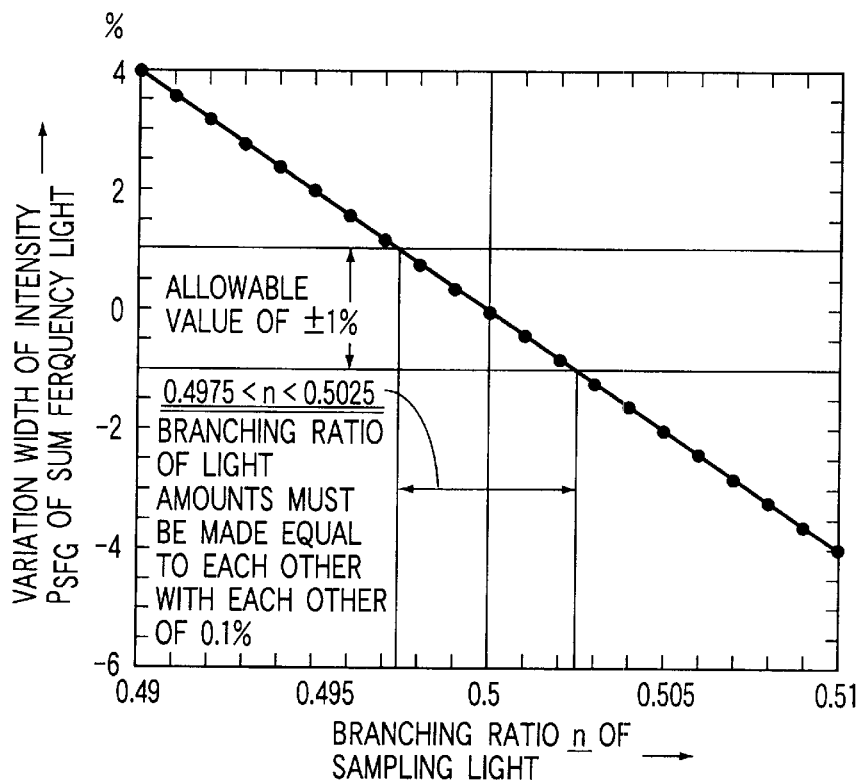
FIG. 5 is an enlarged view of the main part of the graph of FIG 4.

FIG. 5 is an enlarged view of the central portion of FIG. 4.

If the allowable value for variations in the waveform of light due to variations in the polarized state of the target light a is ±1%, then, from FIG. 5, the range of n is $$0.4795 \leq n \leq 0.5025 \qquad (7)$$

In other words, if the value of n is set within the range given by inequality (7), optical pulses can be measured within a waveform variation of ±1%.

To achieve this value by adjustment based on only the planes of polarization of light in the polarization beam splitting unit 11, very sophisticated adjusting operation is required. If, however, the apparatus additionally has a polarization control section or performs weighting in an electric circuit system, this value can be easily achieved.

In this case, the allowable value for optical waveform variations is set to ±1%. Obviously, however, as the allowable value increases, the range defined by inequality (7) broadens.

(Second Embodiment)

Figure 6:
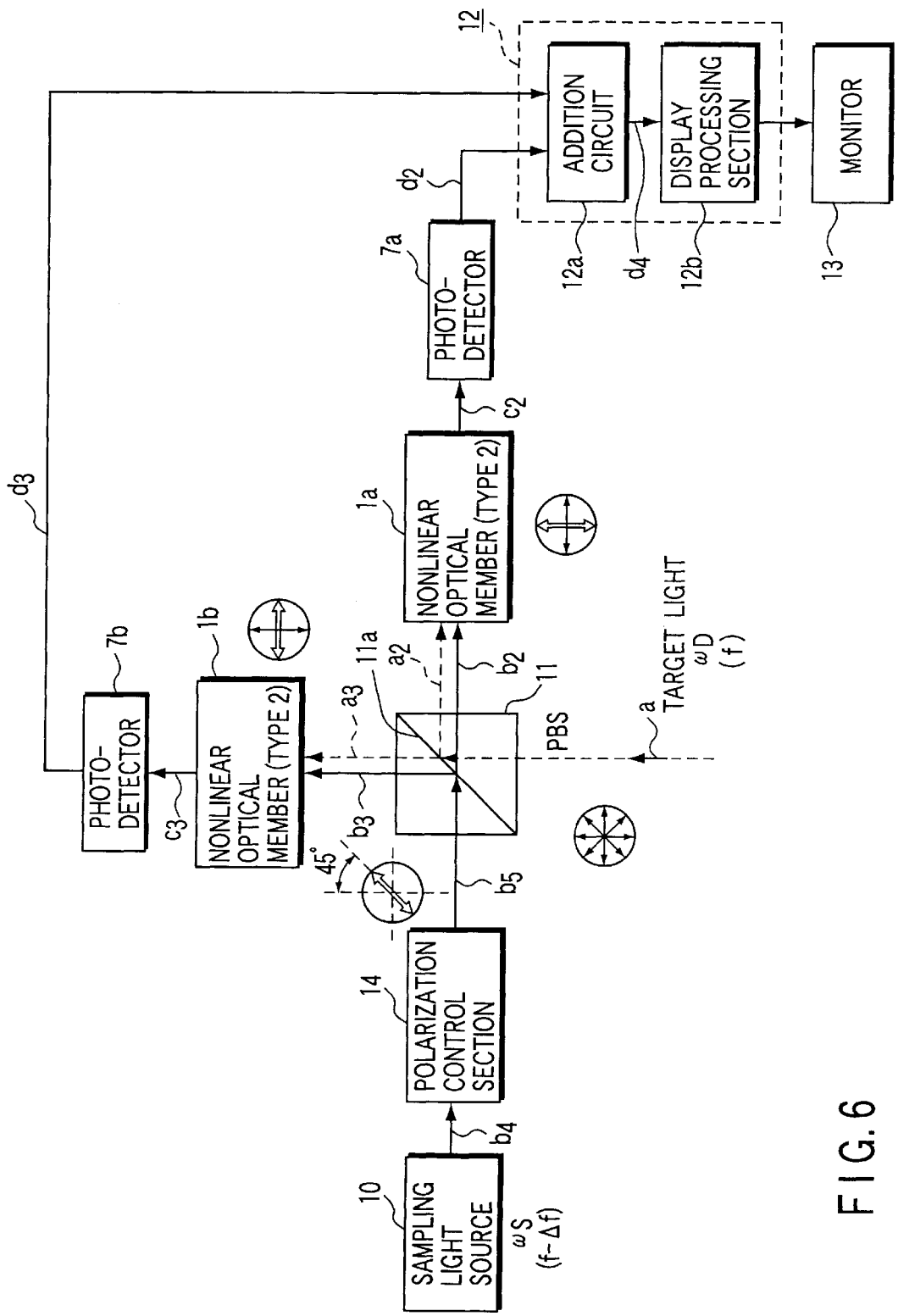
FIG. 6 is a block diagram showing the schematic arrangement of an optical sampling waveform measuring apparatus according to the second embodiment of the present invention.

FIG. 6 is a block diagram showing the schematic arrangement of an optical sampling waveform measuring apparatus according to the second embodiment of the present invention.

The same reference numerals in FIG. 6 denote the same parts of the optical sampling waveform measuring apparatus according to the first embodiment shown in FIG. 1, and a repetitive description will be avoided.

The first embodiment described above is based on the premise that the intensities of the transmitted light and reflected light of the sampling light $b_1$ output from the sampling light source 10 become almost equal in the polarization beam splitting unit 11, and hence the pulse waveform of the target light a can be accurately measured by obtaining the sum frequency light intensity $P_{SFG}$. Assume, however, that the direction of the plane of polarization of the sampling light $b_1$ in the polarization beam splitting unit 11 greatly deviates from 45° (n=0.5), or a higher precision is required, or the nonlinear optical members 1a and 1b differ in sum frequency light generation efficiency. In such a case, variation widths cannot be suppressed within a desired allowable range by only adding the sum frequency light $c_2$ and the sum frequency light $c_3$.

As also described in the first embodiment, therefore, in the optical sampling waveform measuring apparatus of the second embodiment, a polarization control section 14 composed of, for example, a ½ or ¼ wave plate and the like is interposed between a sampling light source 10 and a polarization beam splitting unit 11.

The polarization control section 14 has the function of setting the direction of the plane of polarization of sampling light $b_4$ output from the sampling light source 10 to a 45° direction with respect to a reference direction (0° direction).

The direction of the plane of polarization of sampling light $b_5$ incident from the polarization control section 14 onto the polarization beam splitting unit 11 is accurately set to a 45° direction.

In this case, since intensities $P_{SAM}$ of sampling light $b_2$ and sampling light $b_3$ split by the polarization beam splitting unit 11 and input to nonlinear optical members 1a and 1b in a 90° direction and the reference direction can be set to be equal to each other, variations in an electrical signal $d_4$ obtained by adding sum frequency light $c_2$ and sum frequency light $c_3$ can be suppressed.

The measurement precision for the optical pulse waveform of target light a, obtained from the signal obtained by adding these signals, can therefore be further improved.

In this case, the plane of polarization of the sampling light $b_4$ output from the sampling light source 10 need not be set to a 45° direction.

(Third Embodiment)

Figure 7:
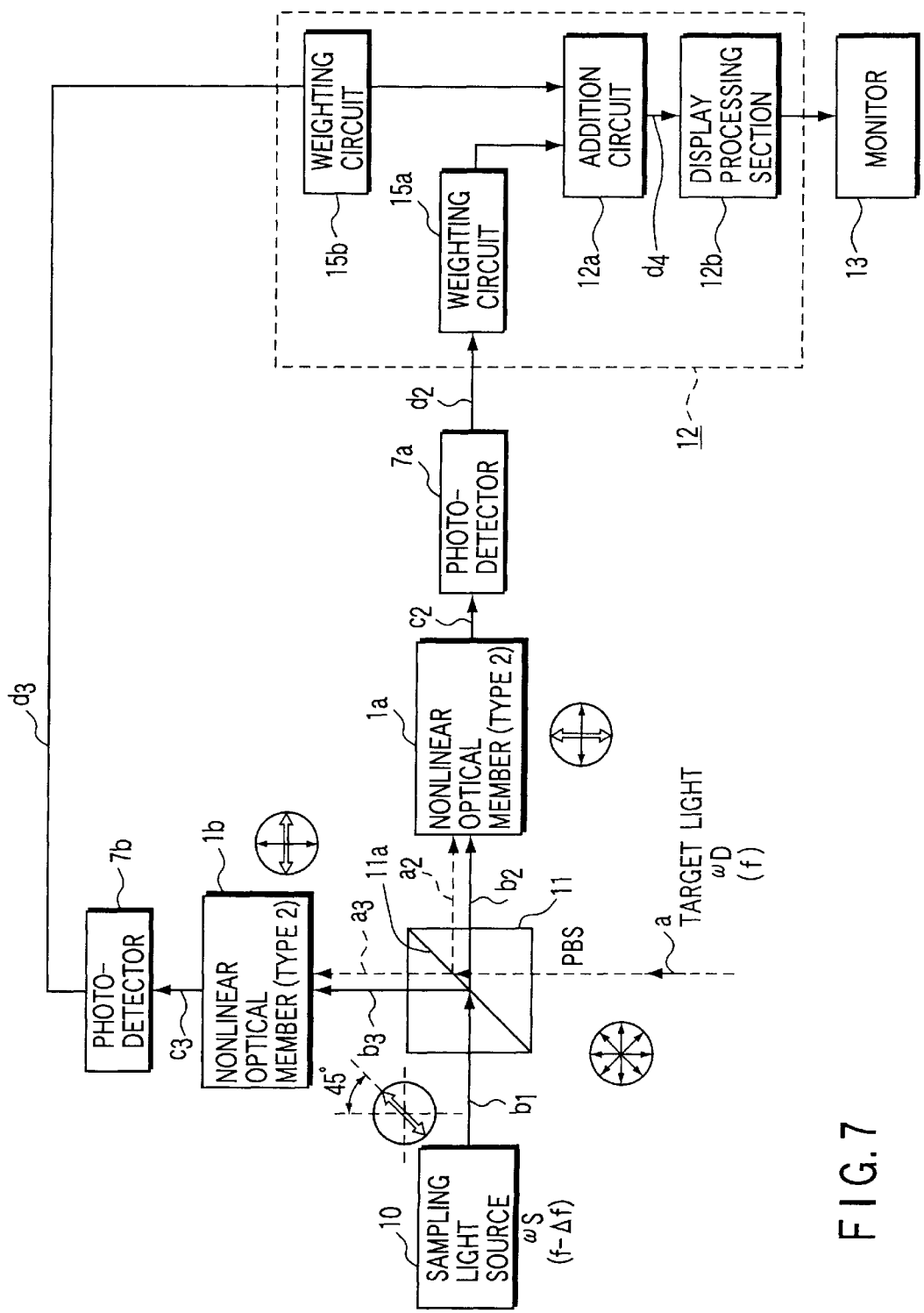
FIG. 7 is a block diagram showing the schematic arrangement of an optical sampling waveform measuring apparatus according to the third embodiment of the present invention.

FIG. 7 is a block diagram showing the schematic arrangement of an optical sampling waveform measuring apparatus according to the third embodiment of the present invention.

The same reference numerals in FIG. 7 denote the same parts of the optical sampling waveform measuring apparatus according to the first embodiment shown in FIG. 1, and a repetitive description will be avoided.

A signal processing section 12 in the optical sampling waveform measuring apparatus of the third embodiment incorporates a pair of weighting circuits 15a and 15b in addition to an addition circuit 12a and a display processing section 12b.

The first embodiment described above is based on the premise that the intensities of the transmitted light and reflected light of the sampling light $b_1$ output from the sampling light source 10 become nearly equal in the polarization beam splitting unit 11, and hence the pulse waveform of the target light a can be accurately measured by obtaining the sum frequency light intensity $P_{SFG}$.

Assume, however, that the direction of the plane of polarization of the sampling light $b_1$ in the polarization beam splitting unit 11 greatly deviates from 45° (n=0.5), a higher precision is required, or the nonlinear optical members 1a and 1b differ in sum frequency light generation efficiency. In such a case, variation widths cannot be suppressed within a desired allowable range by only adding the sum frequency light $c_2$ and the sum frequency light $c_3$.

As described in the first embodiment, therefore, in this embodiment, the weighting circuits 15 and 15b are used to weight electrical signals $d_2$ and $d_3$ output from photodetectors 7a and 7b in accordance with the splitting ratio in the polarization beam splitting unit, thereby minimizing the influence of variations in the polarized state of target light on the measurement result.

(Fourth Embodiment)

Figure 8:
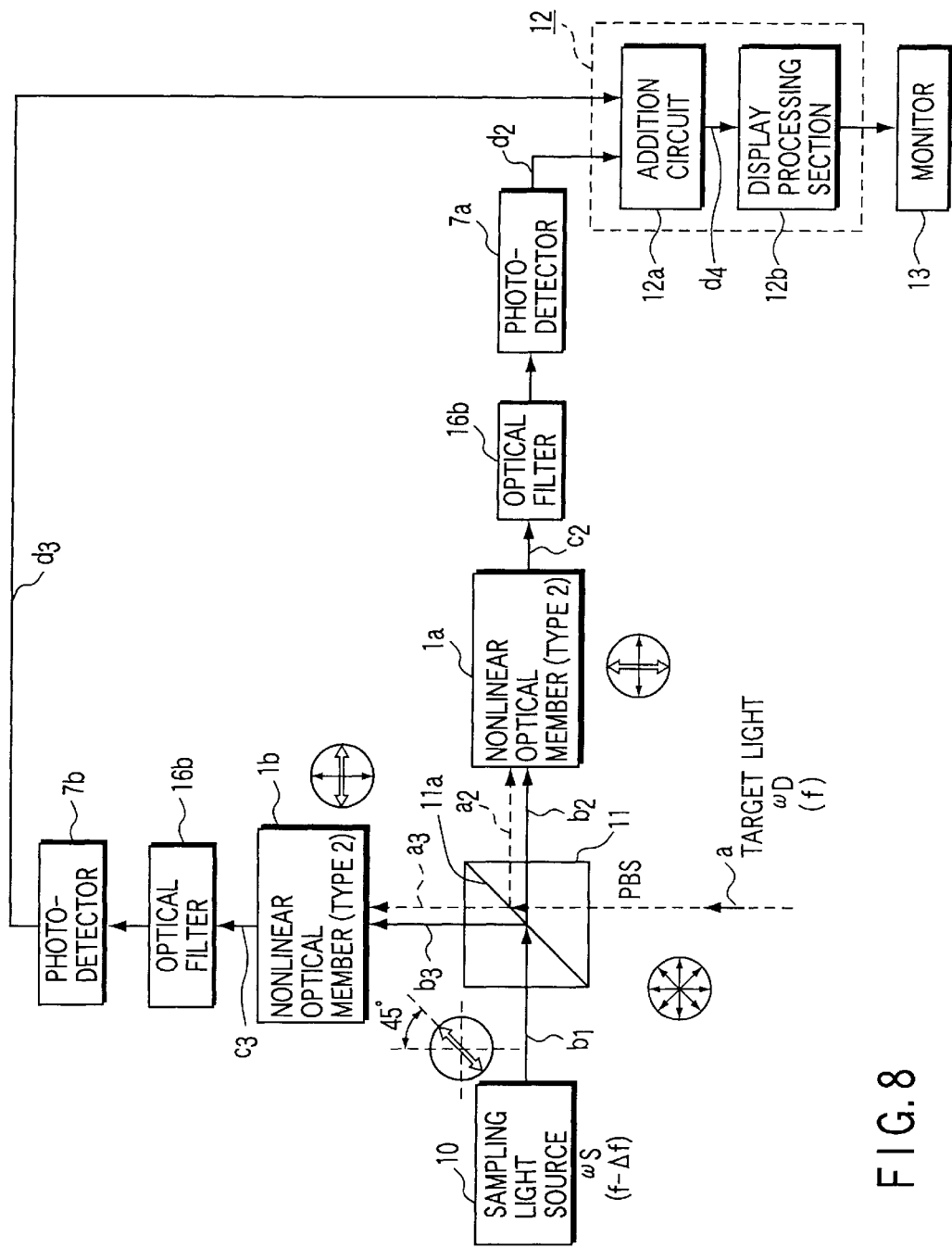
FIG. 8 is a block diagram showing the schematic arrangement of an optical sampling waveform measuring apparatus according to the fourth embodiment of the present invention.

FIG. 8 is a block diagram showing the schematic arrangement of an optical sampling waveform measuring apparatus according to the fourth embodiment of the present invention.

The same reference numerals in FIG. 8 denote the same parts of the optical sampling waveform measuring apparatus according to the first embodiment shown in FIG. 1, and a repetitive description will be avoided.

Optical filters 16a and 16b are respectively inserted between nonlinear optical members 1a and 1b and photodetectors 7a and 7b in the optical sampling waveform measuring apparatus of the fourth embodiment.

Figure 9A:
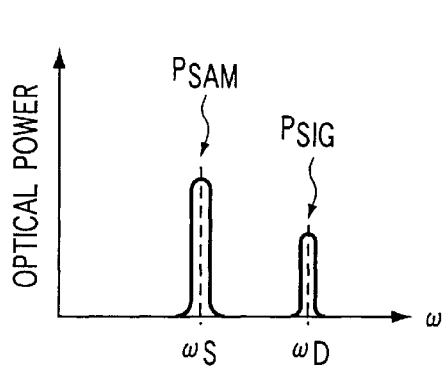
FIGS. 9A and 9B are graphs for explaining the effect of the optical filters assembled in an optical sampling waveform measuring apparatus according to the fourth embodiment of the present invention.
Figure 9B:
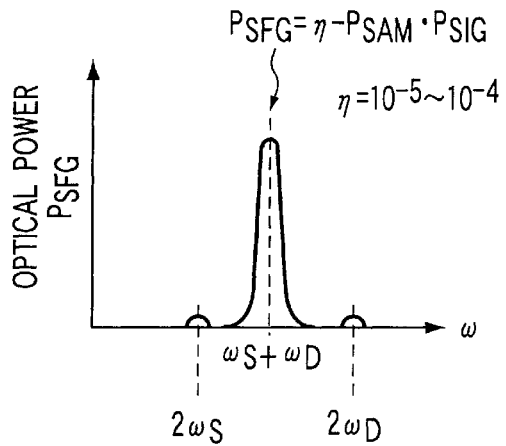

As shown in FIG. 9B, the passband of each of the optical filters 16a and 16b is set to an angular frequency range including an angular frequency $(\omega_S+\omega_D)$ of sum frequency light $c_2$ and sum frequency light $c_3$ and excluding an angular frequency $2\omega_S$ that is twice an angular frequency $\omega_S$ of sampling light $b_1$, an angular frequency $2\omega_D$ that is twice an angular frequency $\omega_D$ of target light a, and the angular frequencies $\omega_S$ and $\omega_D$ that are not converted into the sum angular frequency ($\omega_S+\omega_D$) and the angular frequencies $2\omega_S$ and $2\omega_D$.

As shown in FIGS. 9A and 9B, the sum frequency light $c_2$ and the sum frequency light $c_3$ respectively output from nonlinear optical members 1a and 1b include light components having the angular frequencies $2\omega_S$ and $2\omega_D$ twice the respective angular frequencies, resulting from slight phase mismatching, and unconverted light components having the angular frequencies $\omega_S$ and $\omega_D$, in addition to light components having the angular frequency ($\omega_S+\omega_D$) as the sum of the angular frequencies of the sampling light $b_1$ and the target light a. The optical filters 16a and 16b can remove the light components having these angular frequencies.

As a result, the measurement precision for the pulse waveform of the target light a can be further improved.

(Fifth Embodiment)

Figure 10:
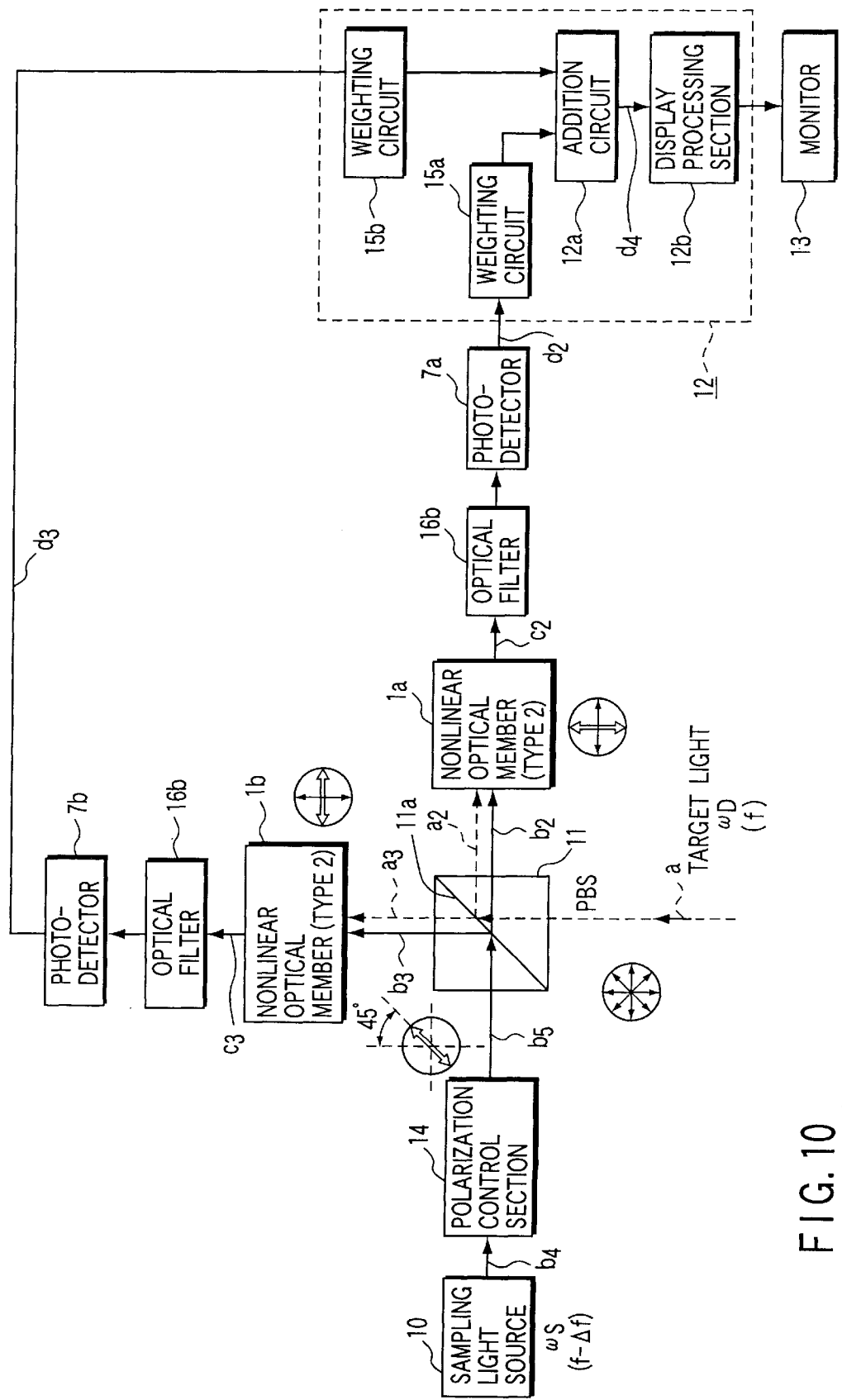
FIG. 10 is a block diagram showing the schematic arrangement of an optical sampling waveform measuring apparatus according to the fifth embodiment of the present invention.

FIG. 10 is a block diagram showing the schematic arrangement of an optical sampling waveform measuring apparatus according to the fifth embodiment of the present invention.

The same reference numerals in FIG. 10 denote the same parts of the embodiments shown in FIGS. 1, 6, 7, and 8, and a repetitive description will be avoided.

In the optical sampling waveform measuring apparatus of the fifth embodiment, sampling light $b_4$ output from a sampling light source 10 is set to have a plane of polarization in a 45° direction in a polarization control section 14, and is incident as new sampling light $b_5$ on a polarization beam splitting unit 11.

Externally input target light a directly enters the polarization beam splitting unit 11.

Optical filters 16a and 16b respectively remove light components having angular frequencies $2\omega_S$ and $2\omega_D$ twice angular frequencies $\omega_S$ and $\omega_D$ of the sampling light $b_5$ and the target light a and unconverted light components having the angular frequencies $\omega_S$ and $\omega_D$ from sum frequency light $c_2$ and sum frequency light $c_3$ output from nonlinear optical members 1a and 1b. As a result, the sum frequency light $c_2$ and the sum frequency light $c_3$ having a sum angular frequency ($\omega_S+\omega_D$) of the angular frequencies $\omega_S$ and $\omega_D$ of the sampling light $b_5$ and the target light a become incident on photodetectors 7a and 7b.

The photodetectors 7a and 7b respectively convert the received sum frequency light $c_2$ and the sum frequency light $c_3$ into electrical signals $d_2$ and $d_3$.

The electrical signals $d_2$ and $d_3$ based on the sum frequency light $c_2$ and the sum frequency light $c_3$ are respectively weighted by weighting circuits 15a and 15b in a signal processing section 12 in accordance with the direction of the plane of polarization of the sampling light $b_5$ incident on the polarization beam splitting unit 11. The resultant signals are then converted into one electrical signal $d_4$ by an addition circuit 12a.

A display processing section 12b detects the optical pulse waveform of the target light a by performing, for example, envelope detection for the electrical signal $d_4$ obtained by addition, and outputs the resultant data to a monitor 13.

In the optical sampling waveform measuring apparatus of the fifth embodiment having this arrangement, the polarization control section 14, the weighting circuits 15 and 15b, and the optical filters 16a and 16b according to the respective embodiments shown in FIGS. 6, 7, and 8 are assembled, in addition to the basic arrangement of the optical sampling waveform measuring apparatus according to the first embodiment shown FIG. 1. The measurement precision for the optical pulse waveform of the target light a can therefore be further improved.

(Sixth Embodiment)

Figure 11:
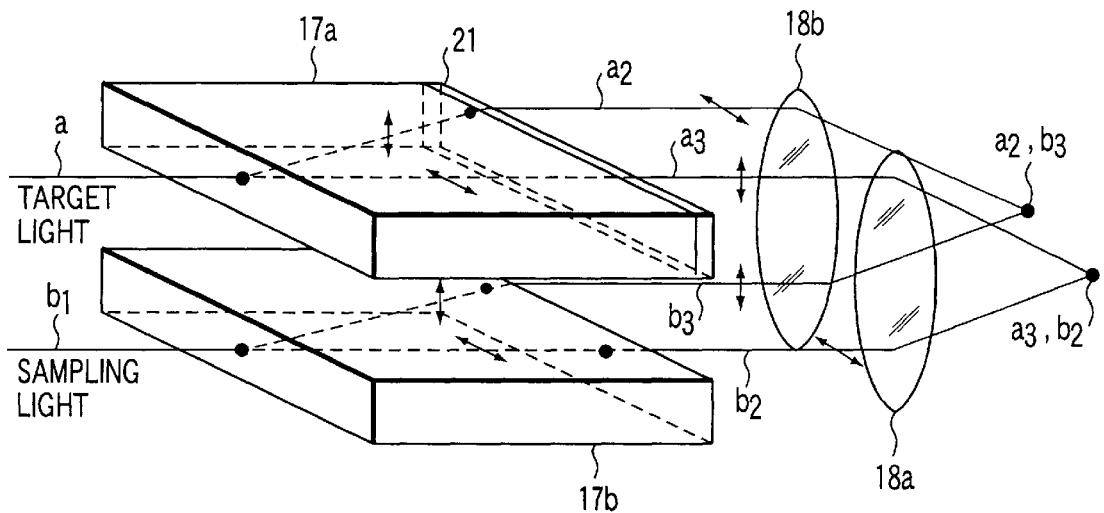
FIG. 11 is a perspective view showing the schematic arrangement of the polarization beam splitting unit assembled in an optical sampling waveform measuring apparatus according to the sixth embodiment of the present invention.

FIG. 11 shows the schematic arrangement of a polarization beam splitting unit assembled in the optical sampling waveform measuring apparatus of the present invention described above.

This polarization beam splitting unit is made up of a pair of calcite members 17a and 17b arranged in the same crystal direction, a ½ wave plate 21 bonded to the exit surface of one calcite member 17a, and a pair of focusing lenses 18a and 18b for focusing/multiplexing the light beams output from the ½ wave plate 21 and the other calcite member 17b.

The calcite member 17a splits externally input target light a into a light component $a_3$ having a plane of polarization in a 90° direction with respect to a reference direction (0° direction) and a light component $a_2$ having a plane of polarization in the reference direction (0° direction).

Similarly, the calcite member 17b splits sampling light $b_1$ output from a sampling light source 10 having a plane of polarization in a 45° direction into a light component $b_2$ having a plane of polarization in a 90° direction with respect to the reference direction (0° direction) and a light component $b_3$ having a plane of polarization in the reference direction (0° direction).

The polarization plane of the target light component $a_3$ output from the calcite member 17a and having a plane of polarization in the 90° direction is rotated through 90° to the reference direction (0° direction) by the ½ wave plate 21. This light component is then incident on one focusing lens 18a.

The sampling light component $b_2$ output from the other calcite member 17b and having a plane of polarization in the 90° direction is directly incident on one focusing lens 18a.

As a result, the target light $a_3$ whose plane of polarization is changed to the reference direction (0° direction) by the focusing lens 18a and the sampling light $b_2$ whose plane of polarization remains in the 90° direction are multiplexed, and the resultant light is sent to on a nonlinear optical member 1b.

The sampling light component $b_3$ output from the calcite member 17b and having a plane of polarization in the reference direction (0° direction) is directly incident on the other focusing lens 18b.

The polarization plane of the target light component $a_2$ output from the calcite member 17a and having a plane of polarization in the reference direction (0° direction) is rotated through 90° to the 90° direction by the ½ wave plate 21. The resultant light is then sent to the other focusing lens 18b.

As a result, the target light $a_2$ whose plane of polarization is changed to the 90° direction and the sampling light $b_3$ whose plane of polarization remains in the reference direction (0° direction) are multiplexed by the focusing lens 18b. The resultant light is launched on a nonlinear optical member 1a.

In this manner, the two calcite members 17a and 17b, the one ½ wave plate 21, and the two focusing lenses 18a and 18b are used, and the optical path lengths of light beams respectively incident on the focusing lenses 18a and 18b are set to be equal, thereby exhibiting the same function as that of the polarization beam splitting unit 11 realized by a polarization beam splitter (PBS) in the first to fifth embodiments.

(Seventh Embodiment)

FIG. 12A shows the schematic arrangement of a polarization beam splitting unit assembled in the optical sampling waveform measuring apparatus of the present invention described above.

FIG. 12B is a plan view for explaining the propagating direction of each light beam in this polarization beam splitting unit.

This polarization beam splitting unit is made up of first and second calcite members 19a and 19b set on the same optical axis, a pair of reflecting mirrors 20a and 20b, and one ½ wave plate 21a.

Referring to FIGS. 12A and 12B, the first calcite member 19a splits incoming target light $\underline{a}$ into a light component $a_3$ having a plane of polarization in a 90° direction and a light component $a_2$ having a plane of polarization in a reference direction (0° direction).

Similarly, the first calcite member 19a splits sampling light $b_1$ output from a sampling light source 10 and having a plane of polarization in a 45° direction into a light component $b_2$ having a plane of polarization in a 90° direction with respect to the reference direction (0° direction) and a light component $b_3$ having a plane of polarization in the reference direction (0° direction).

The 90°-direction sampling light component $b_2$ and the reference-direction (0°-direction) target light component $a_2$ are multiplexed at the exit of the first calcite member 19a. The polarization direction of the multiplexed light is rotated through 90° by the ½ wave plate 21a. The resultant light then strikes a nonlinear optical member 1a through the reflecting mirror 20a.

The polarization direction of the 90°-direction target light component $a_3$ output from the first calcite member 19a is rotated through 90° to the reference direction (0° direction) by the ½ wave plate 21a. The resultant light is refracted at the entrance of the second calcite member 19b and propagates straight in the display processing section 12b in an oblique direction.

The polarization direction of the 0°-direction sampling light component $b_3$ output from the first calcite member 19a is rotated through 90° to the 90° direction by the ½ wave plate 21a. The resultant light propagates straight in the second calcite member 19b and emerges therefrom at the same position as that of the target light $a_3$ in the reference direction (0° direction).

As a result, the target light component $a_3$ whose polarization direction is changed to the reference direction (0° direction) and the sampling light component $b_3$ whose plane of polarization direction is changed to the 90° direction are multiplexed at the exit of the second calcite member 19b. The resultant light strikes a nonlinear optical member 1b through the reflecting mirror 20b.

Since an optical path length difference almost equal to the size of the second calcite member 19b is produced between the optical path lengths from this polarization beam splitting unit to the nonlinear optical members 1a and 1b, the positions of the nonlinear optical members 1a and 1b are accurately adjusted to make these optical path lengths equal.

As described above, the dimensions of the two calcite members 19a and 19b and the ½ wave plate 21a are set such that light components traveling along the optical axes and inside the respective components are multiplexed at the exit. With this, the same function as that of the polarization beam splitting unit 11 realized by the polarization beam splitter (PBS) in the first to fifth embodiments can be obtained.

(Eighth Embodiment)

Figure 13:
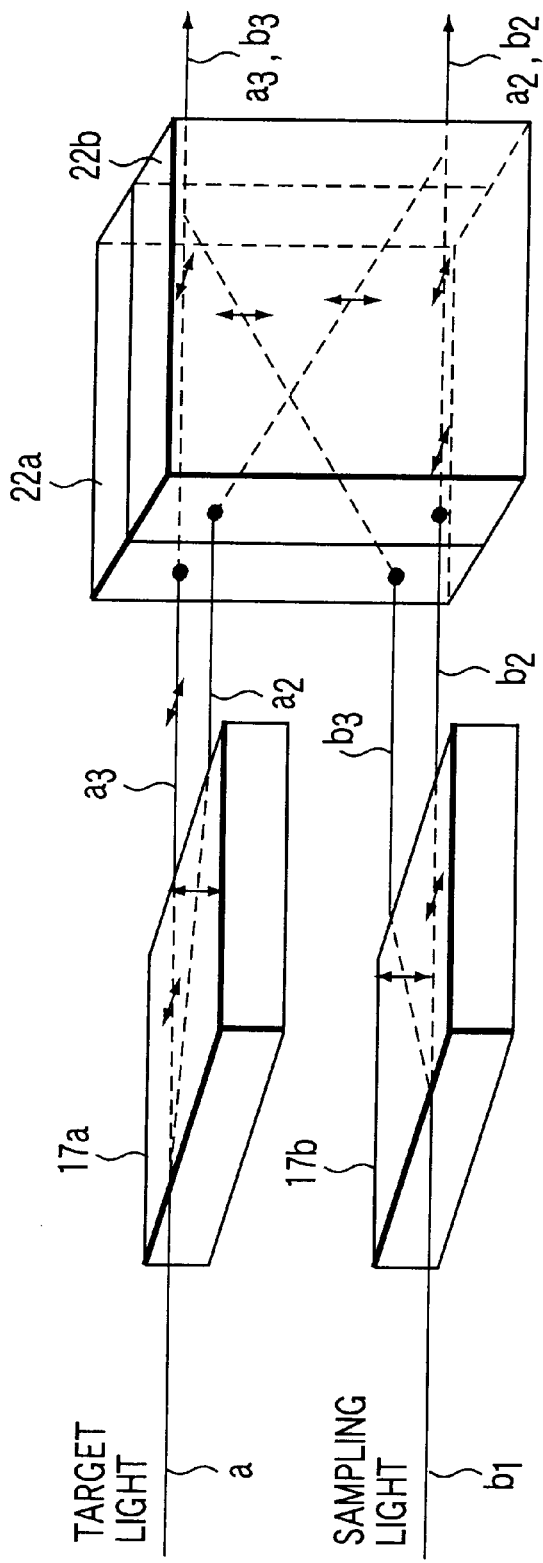
FIG. 13 is a perspective view showing the schematic arrangement of the polarization beam splitting unit assembled in an optical sampling waveform measuring apparatus according to the eighth embodiment of the present invention.

FIG. 13 shows the schematic arrangement of a polarization beam splitting unit assembled in the optical sampling waveform measuring apparatus of the present invention described above.

The same reference numerals in FIG. 13 denote the same parts of the sixth embodiment shown in FIG. 11, and a repetitive description will be avoided.

The polarization beam splitting unit according to the eighth embodiment is made up of a pair of calcite members 17a and 17b arranged in the same crystal direction and forming a first calcite portion, and the other pair of calcite members 22a and 22b arranged in a direction perpendicular to the pair of calcite members 17a and 17b and forming a second calcite portion.

The calcite member 17a splits externally input target light $\underline{a}$ into a light component $a_3$ having a plane of polarization in a 90° direction with respect to a reference direction (0° direction) and a light component $a_2$ having a plane of polarization in the reference direction (0° direction).

Similarly, the calcite member 17b splits sampling light $b_1$ output from a sampling light source 10 and having a plane of polarization in a 45° direction into a light component $b_2$ having a plane of polarization in a 90° direction with respect to the reference direction (0° direction) and a light component $b_3$ having a plane of polarization in the reference direction (0° direction).

The target light component $a_3$ output from the calcite member 17a and having a plane of polarization in the 90° direction travels straight in the calcite member 22a.

The sampling light component $b_3$ output from the calcite member 17b and having a plane of polarization in the reference direction (0° direction) is refracted by the calcite member 22a and output as the same position as that of the target light component $a_3$.

As a result, the target light component $a_3$ having a plane of polarization in the 90° direction is multiplexed with the sampling light component $b_3$ having a plane of polarization in the reference direction. The resultant light is incident on a nonlinear optical member 1b.

The sampling light component $b_2$ output from the calcite member 17b and having a plane of polarization in the 90° direction travels straight in the calcite member 22b.

The sampling light component $a_2$ output from the calcite member 17a and having a plane of polarization in the reference direction (0° direction) is refracted by the calcite member 22b and output at the same position as that of the sampling light component $b_2$.

As a result, the sampling light component $b_2$ having a plane of polarization in the 90° direction is multiplexed with the target light component $a_2$ having a plane of polarization in the reference direction (0° direction). The resultant light is incident on a nonlinear optical member 1a.

As described above, the outer dimensions of the four calcite members 17a, 17b, 18a, and 18b are set such that light components propagating along the optical axes and inside the respective components are multiplexed at the exit. With this technique, the same function as that of the polarization beam splitting unit 11 realized by the polarization beam splitter (PBS) in the first to fifth embodiments can be obtained.

(Ninth Embodiment)

FIG. 14A shows the schematic arrangement of a polarization beam splitting unit assembled in the optical sampling waveform measuring apparatus of the present invention described above.

FIG. 14B is a plan view for explaining the direction each light component travels in this polarization beam splitting unit.

The same reference numerals in FIGS. 14A and 14B denote the same parts of the seventh embodiment shown in FIGS. 12A and 12B, and a repetitive description will be avoided.

As shown in FIGS. 14A and 14B, the polarization beam splitting unit according to the ninth embodiment is equivalent to the polarization beam splitting unit of the polarization beam splitting unit of the seventh embodiment in FIGS. 12A and 12B from which the ½ wave plate 21a is removed.

Referring to FIGS. 14A and 14B, a first calcite member 19a splits incoming target light a into a light component $a_3$ having a plane of polarization in a 90° direction and a light component $a_2$ having a plane of polarization in a reference direction (0° direction).

In a similar fashion, the first calcite member 19a splits sampling light $b_1$ output from a sampling light source 10 having a plane of polarization in a 45° direction into a light component $b_2$ having a plane of polarization in a 90° direction with respect to the reference direction (0° direction) and a light component $b_3$ having a plane of polarization in the reference direction (0° direction).

The 90°-direction sampling light component $b_2$ and the reference-direction (0°-direction) target light component $a_2$ are multiplexed at the exit of the first calcite member 19a. The resultant light is incident on a nonlinear optical member 1a through a reflecting mirror 20a.

The 90°-direction target light component $a_3$ output from the first calcite member 19a travels straight in a second calcite member 19b.

The 0°-direction sampling light component $b_3$ output from the first calcite member 19a is refracted at the entrance of the second calcite member 19b and output at the same position as that of the 90°-direction target light component $a_3$.

As a result, the 90°-direction target light component $a_3$ and the reference-direction (0°-direction) sampling light component $a_3$ are multiplexed at the exit of the second calcite member 19b. The resultant light is incident on a nonlinear optical member 1b through a reflecting mirror 20b.

Since an optical path length difference almost equal to the size of the second calcite member 19b is produced between the optical path lengths from this polarization beam splitting unit to the nonlinear optical members 1a and 1b, the positions of the nonlinear optical members 1a and 1b are accurately adjusted to make the two optical path lengths equal.

As described above, the dimensions of the two calcite members 19a and 19b are set such that light components propagating along the optical axes and inside these components are multiplexed at the exit. With this, the same function as that of the polarization beam splitting unit 11 realized by the polarization beam splitter (PBS) in the first to fifth embodiments can be obtained.

Note that the polarization beam splitting unit composed of a plurality of calcite members as shown in FIGS. 11, 12A, 12B, 13, 14A, and 14B can be assembled in an optical processing apparatus other than the above optical sampling waveform measuring apparatus.

As has been described above, in the optical sampling waveform measuring apparatus of the present invention, one polarization beam splitting unit and a pair of nonlinear optical members of type II are assembled to split sampling light and target light in units of planes of polarization and respectively obtain the sum frequency light beams, and they are added together afterward.

According to the optical sampling waveform measuring apparatus of the present invention, therefore, even if the plane of polarization of the target light varies with time, and the direction of the plane of polarization of the sampling light cannot accurately set, the optical pulse waveform of the target light can always be measured with high precision.

In addition, according to the optical sampling waveform measuring apparatus of the present invention, a plurality of calcite members constitute a polarization beam splitting unit for splitting each of sampling light and target light into two light components having planes of polarization shifted 90° from each other, multiplexing these sampling light components and target light components, respectively having planes of polarization shifted 90° from each other, into two pairs of multiplexed light beams, and respectively outputting them to different optical paths.

In this manner, a polarization beam splitting unit can be easily made up of a combination of calcite members each having a physical property of splitting incident light into two light components having planes of polarization shifted 90° from each other.

This polarization beam splitting unit made up of the calcite members can be used in various optical apparatuses other than the above optical sampling waveform measuring apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical sampling waveform measuring apparatus for measuring a pulse waveform of target light, comprising:

a sampling light source for generating a pulse sequence of sampling light that can be split into a polarized light component in a 0° direction and a polarized light component in a 90° direction both with respect to a reference direction;

a polarization beam splitting unit for receiving sampling light output from said sampling light source and the target light, splitting each of the sampling light and the target light into a polarized light component in a 0° direction and a polarized light component in a 90° direction both with respect to the reference direction, and outputting the 0°-direction polarized light component of the sampling light and the 90°-direction polarized light component of the target light, as first output light, and the 90°-direction polarized light component of the sampling light and the 0°-direction polarized light component of the target light, as second output light, to first and second optical paths, respectively;

a first nonlinear optical member for performing type II phase matching to generate a cross-correlation signal of the sampling light and the target light output to the first optical path as sum frequency light;

a second nonlinear optical member for performing type II phase matching to generate a cross-correlation signal of the sampling light and the target light output to the second optical path as sum frequency light;

a first photodetector for converting the sum frequency light output from said first nonlinear optical member into an electrical signal;

a second photodetector for converting the sum frequency light output from said second nonlinear optical member into an electrical signal; and a signal processing section for adding the electrical signals output from said first and second photodetectors, and processing the resultant electrical signal to generate an optical pulse waveform of the target light.

2. An apparatus according to claim 1, further comprising a polarization control section interposed between said sampling light source and said polarization beam splitting unit to control a plane of polarization of the sampling light output from said sampling light source to a specific direction.

3. An apparatus according to claim 1, wherein said signal processing section weights the electrical signals output from said first and second photodetectors in accordance with a direction of a plane of polarization of the sampling light incident on said polarization beam splitting unit, adds the weighted electrical signals together, and processes the resultant electrical signal to generate an optical pulse waveform of the target light.

4. An apparatus according to claim 1, further comprising:
a first optical filter which is interposed between said first nonlinear optical member and said first photodetector and has a passband set to a frequency range of the sum frequency light; and
a second optical filter which is interposed between said second nonlinear optical member and said second photodetector and has a passband set to a frequency range of the sum frequency light.

5. An apparatus according to claim 1, further comprising:
a polarization control section interposed between said sampling light source and said polarization beam splitting unit to control a plane of polarization of the sampling light output from said sampling light source to a specific direction;
a first optical filter which is interposed between said first nonlinear optical member and said first photodetector and has a passband set to a frequency range of the sum frequency light; and
a second optical filter which is interposed between said second nonlinear optical member and said second photodetector and has a passband set to a frequency range of the sum frequency light.

6. An apparatus according to claim 1, further comprising:
a polarization control section interposed between said sampling light source and said polarization beam splitting unit to control a plane of polarization of the sampling light output from said sampling light source to a specific direction,
wherein said signal processing section weights the electrical signals output from said first and second photodetectors in accordance with a direction of a plane of polarization of the sampling light incident on said polarization beam splitting unit, adds the weighted electrical signals together, and processes the resultant electrical signal to generate an optical pulse waveform of the target light.

7. An apparatus according to claim 1, further comprising:
a first optical filter which is interposed between said first nonlinear optical member and said first photodetector and has a passband set to a frequency range of the sum frequency light; and
a second optical filter which is interposed between said second nonlinear optical member and said second photodetector and has a passband set to a frequency range of the sum frequency light,
wherein said signal processing section weights the electrical signals output from said first and second photodetectors in accordance with a direction of a plane of polarization of the sampling light incident on said polarization beam splitting unit, adds the weighted electrical signals together, and processes the resultant electrical signal to generate an optical pulse waveform of the target light.

8. An apparatus according to claim 1, further comprising:
a polarization control section interposed between said sampling light source and said polarization beam splitting unit to control a plane of polarization of the sampling light output from said sampling light source to a specific direction;
a first optical filter which is interposed between said first nonlinear optical member and said first photodetector and has a passband set to a frequency range of the sum frequency light; and
a second optical filter which is interposed between said second nonlinear optical member and said second photodetector and has a passband set to a frequency range of the sum frequency light,
wherein said signal processing section weights the electrical signals output from said first and second photodetectors in accordance with a direction of a plane of polarization of the sampling light incident on said polarization beam splitting unit, adds the weighted electrical signals together, and processes the resultant electrical signal to generate an optical pulse waveform of the target light.

9. An apparatus according to claim 1, wherein said polarization beam splitting unit comprises:
a pair of calcite members for respectively splitting incident sampling light and incident target light into two light components having planes of polarization shifted 90° from each other;
a ½ wave plate for rotating polarized states of the two light components, output from one of said pair of calcite members and having planes of polarization shifted 90° from each other, through 90°; and
a pair of focusing lenses for focusing/multiplexing the sampling light and the target light output from the other of said pair of calcite members and said ½ wave plate and having planes of polarization shifted 90° from each other.

10. An apparatus according to claim 1, wherein said polarization beam splitting unit comprises:
a first calcite member for receiving sampling light and target light and outputting three light components including multiplexed light of sampling and target light components having planes of polarization shifted 90° from each other and sampling and target light components having planes of polarization shifted 90° from each other;
a ½ wave plate for rotating polarized states of the three light components, output from said first calcite member, through 90°; and
a second calcite member for multiplexing and outputting sampling and target light components output from said ½ wave plate and having planes of polarization shifted 90° from each other.

11. A polarization beam splitting unit comprising:
a pair of calcite members for respectively splitting incident first light and incident second light into two light components having planes of polarization shifted 90° from each other;
a ½ wave plate for rotating polarized states of the two light components, output from one of said pair of calcite members and having planes of polarization shifted 90° from each other, through 90°; and
a pair of focusing lenses for focusing/multiplexing the first light and the second light output from the other of said pair of calcite members and said ½ wave plate and having planes of polarization shifted 90° from each other.

12. A polarization beam splitting unit, comprising:

a first calcite member for receiving first light and second light and outputting three light components including multiplexed light of first and second light components having planes of polarization shifted 90° from each other and first and second light components having planes of polarization shifted 90° from each other;

a ½ wave plate for rotating polarized states of the three light components, output from said first calcite member, through 90°;

a second calcite member for multiplexing and outputting first and second light components output from said ½ wave plate and having planes of polarization shifted 90° from each other;

a first optical member for extracting the multiplexed light of first and second light components having planes of polarization shifted 90° from each other, from the three light components output from one of said first calcite member and said ½ wave plate; and a second optical member for extracting the first and second light components having planes of polarization shifted 90° from each other, multiplexed and output from said second calcite member.

* * * * *